United States Patent
Matsui et al.

(10) Patent No.: US 9,456,105 B2
(45) Date of Patent: Sep. 27, 2016

(54) IMAGE SENSOR UNIT AND METHOD FOR MANUFACTURING IMAGE SENSOR UNIT

(71) Applicant: MITSUBISHI ELECTRIC CORPORATION, Chiyoda-ku (JP)

(72) Inventors: Hideki Matsui, Chiyoda-ku (JP); Akiko Fujiuchi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/767,993

(22) PCT Filed: Jan. 16, 2014

(86) PCT No.: PCT/JP2014/050703
§ 371 (c)(1),
(2) Date: Aug. 14, 2015

(87) PCT Pub. No.: WO2014/129237
PCT Pub. Date: Aug. 28, 2014

(65) Prior Publication Data
US 2015/0381848 A1     Dec. 31, 2015

(30) Foreign Application Priority Data

Feb. 22, 2013 (JP) .................................. 2013-033287
Feb. 27, 2013 (JP) .................................. 2013-037849

(51) Int. Cl.
H04N 1/193     (2006.01)
H04N 1/028     (2006.01)
H04N 1/031     (2006.01)

(52) U.S. Cl.
CPC ............ *H04N 1/193* (2013.01); *H04N 1/0281* (2013.01); *H04N 1/02835* (2013.01); *H04N 1/02885* (2013.01); *H04N 1/02895* (2013.01); *H04N 1/0318* (2013.01); *H04N 2201/0081* (2013.01); *H04N 2201/0082* (2013.01); *H04N 2201/0093* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,945,664 A | 8/1999 | Ogura | |
| 7,978,379 B2* | 7/2011 | Fujiuchi et al. | ... H04N 1/02815 358/475 |
| 8,416,472 B2* | 4/2013 | Wilsher | ............ H04N 1/02815 358/475 |

FOREIGN PATENT DOCUMENTS

| | | |
|---|---|---|
| JP | 4-103763 U | 9/1992 |
| JP | 6-217078 A | 8/1994 |

(Continued)

OTHER PUBLICATIONS

International Search Report issued Apr. 8, 2014 in PCT/JP2014/050703 filed Jan. 16, 2014.
Office Action mailed Jun. 21, 2016 in Japanese Patent Application No. 2013-033287 (with English Translation).

*Primary Examiner* — Paul F Payer
(74) *Attorney, Agent, or Firm* — Oblon, McClelland, Maier & Neustadt, L.L.P.

(57) ABSTRACT

Light guides emit light from the side surface thereof toward the subject to be read, the light emitted to one end surface of each of the light guides. A frame is frame shaped, the frame houses the light guides and a lens, the frame including light guide holders that support a first to-be-supported section on the side surface of the light guides. A cover covers at least a part of one opening of the frame, and does not restrict light from passing through between the light guides and the subject to be read, the cover including light guide holders that support a second to-be-supported section opposite of the first to-be-supported section on the side surface of the light guides. The light guides are fixed inside the frame by the flange portion including the light guide holders provided by the frame and the light guide holders provided by the cover.

10 Claims, 16 Drawing Sheets

(56) References Cited

FOREIGN PATENT DOCUMENTS

| JP | 10-190959 A | 7/1998 |
| JP | 10-285342 A | 10/1998 |
| JP | 2001-230902 A | 8/2001 |
| JP | 2005-223424 A | 8/2005 |
| JP | 3126200 U | 10/2006 |
| JP | 2010-283436 A | 12/2010 |

* cited by examiner

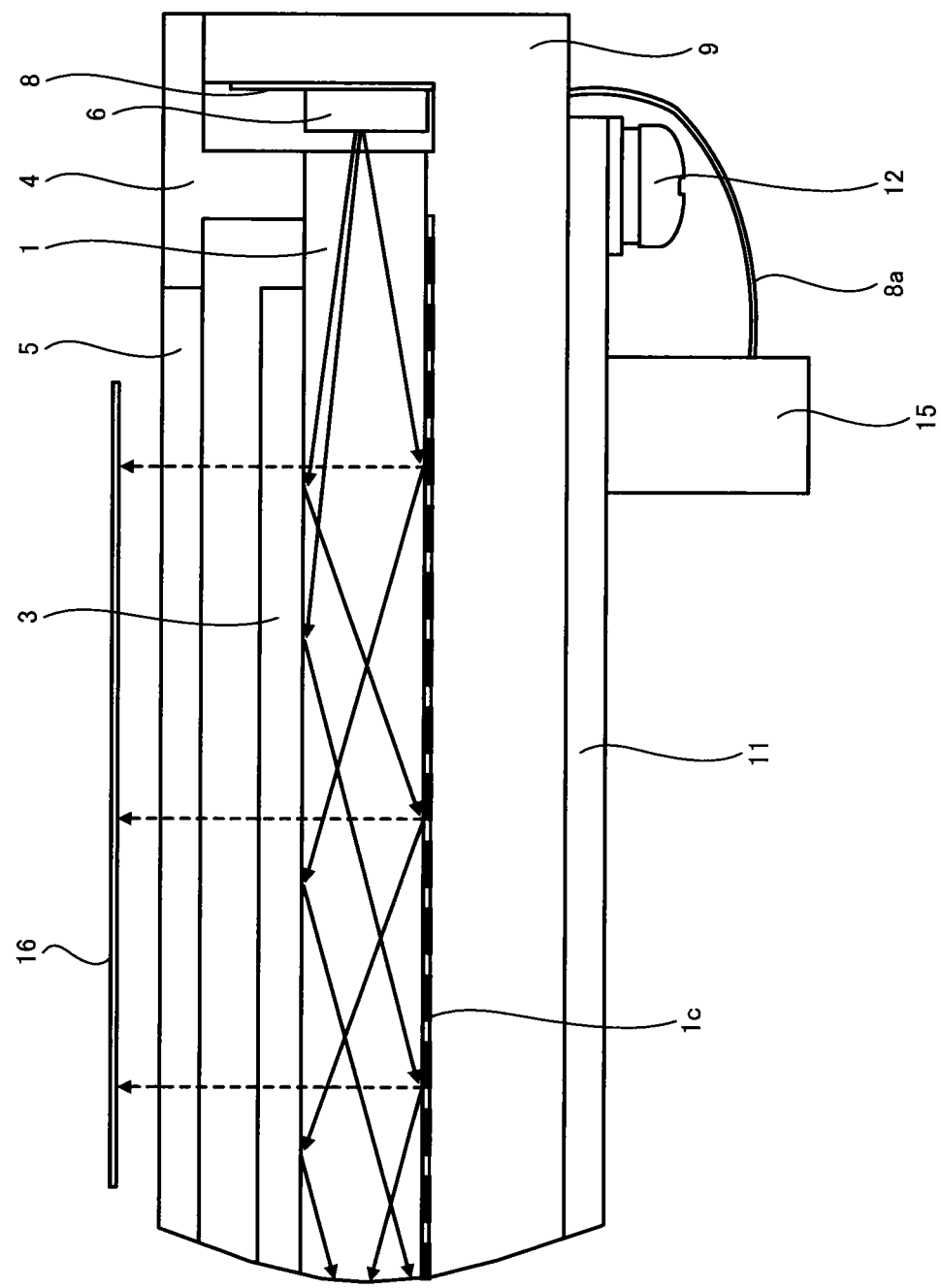

IMAGE SENSOR UNIT AND METHOD FOR MANUFACTURING IMAGE SENSOR UNIT

TECHNICAL FIELD

The present disclosure relates to image sensor units and a method for manufacturing image sensor units.

BACKGROUND ART

Image sensor units that generate images of a subject to be read such as printed matter are presently known. Image sensor units incorporated in devices such as copy machines, multi-function printers, facsimiles, and scanners are used. Internally, image sensor units typically include a light source, a light guide, a lens, a line sensor, and the like.

Here, when the position of a light guide inside the image sensor unit deviates, an image of the subject to be read cannot be accurately generated. Therefore, there is a demand for light guides to be held firmly inside the image sensor unit. For example, Patent Literature 1 discloses a method of providing a holder in addition to a cover and a frame, and of holding a light guide with this holder.

CITATION LIST

Patent Literature

Patent Literature 1: Unexamined Japanese Patent Application Kokai Publication No. 2010-283436

SUMMARY OF INVENTION

Technical Problem

However, in the method disclosed in Patent Literature 1, it is necessary to provide a holder in addition to the cover and the frame. As a result, in the method disclosed in Patent Literature 1, the number of components had to be increased, and assembling is not easy task. For these reasons, there has been a demand for technology that is simple in configuration yet capable of maintaining accuracy.

The present disclosure is made in view of the aforementioned problems, and it is an objective of the present disclosure to provide image sensor units that can maintain accuracy with a simple configuration. It is another objective of the present disclosure to provide a method for manufacturing image sensor units.

Solution to Problem

To achieve the objectives addressed above, an image sensor unit according to the present disclosure includes a light guide, a light source, a lens, a frame, a cover, a line sensor, and a sensor board. The light guide is column shaped and is configured to emit light from a side surface thereof toward a subject to be read, the light emitted to an end surface of the light guide. The light source is positioned to face the end surface of the light guide, and is configured to emit light toward the end surface of the light guide. The lens is configured to cause light reflected by the subject to be read to converge in the width direction of the light guide, the light emitted from the side surface of the light guide. The frame is frame shaped, and is configured to house the light guide and the lens, the frame including a first support configured to support a first to-be-supported section on the side surface of the light guide. The cover is configured to cover at least a part of one opening of the frame and not to restrict light from passing through between the light guide and the subject to be read, the cover including a second support configured to support a second to-be-supported section opposite of the first to-be-supported section on the side surface of the light guide. The line sensor is configured to receive light converged in the width direction of the light guide by the lens. The sensor board, onto which the line sensor is mounted along the lengthwise direction of the light guide, is configured to cover the other opening of the frame. The light guide is fixed inside the frame by a flange portion composed of the first support of the frame and the second support of the cover.

Advantageous Effects of Invention

In the present disclosure, the light guide is fixed inside the frame by a flange portion composed of the first support of the frame and the second support of the cover. Therefore, according to the present disclosure, accuracy can be maintained with a simple configuration.

BRIEF DESCRIPTION OF DRAWINGS

FIG. 11 is a diagram showing the path of the emitted light from the light source to where the light reaches the subject to be read;

DESCRIPTION OF EMBODIMENTS

The embodiments of the present disclosure are described below with reference to the drawings.

Embodiments

The image sensor unit 100 according to an embodiment of the present disclosure includes a reflection light source-type image sensor that generates an image of a subject to be read (object). The image sensor unit 100 has a scanning function and a light receiving function. To enable the image sensor unit 100 to generate an image of a subject to be read, it is necessary to modify the positional relationship between the image sensor unit 100 and the subject to be read. Thus, when the image sensor 100 generates an image of the subject to be read, at least one of the image sensor unit 100 and the subject to be read is conveyed. The image sensor unit 100 incorporated in devices such as copy machines, multi-function printers, facsimiles, and scanners are used.

Figure 1:
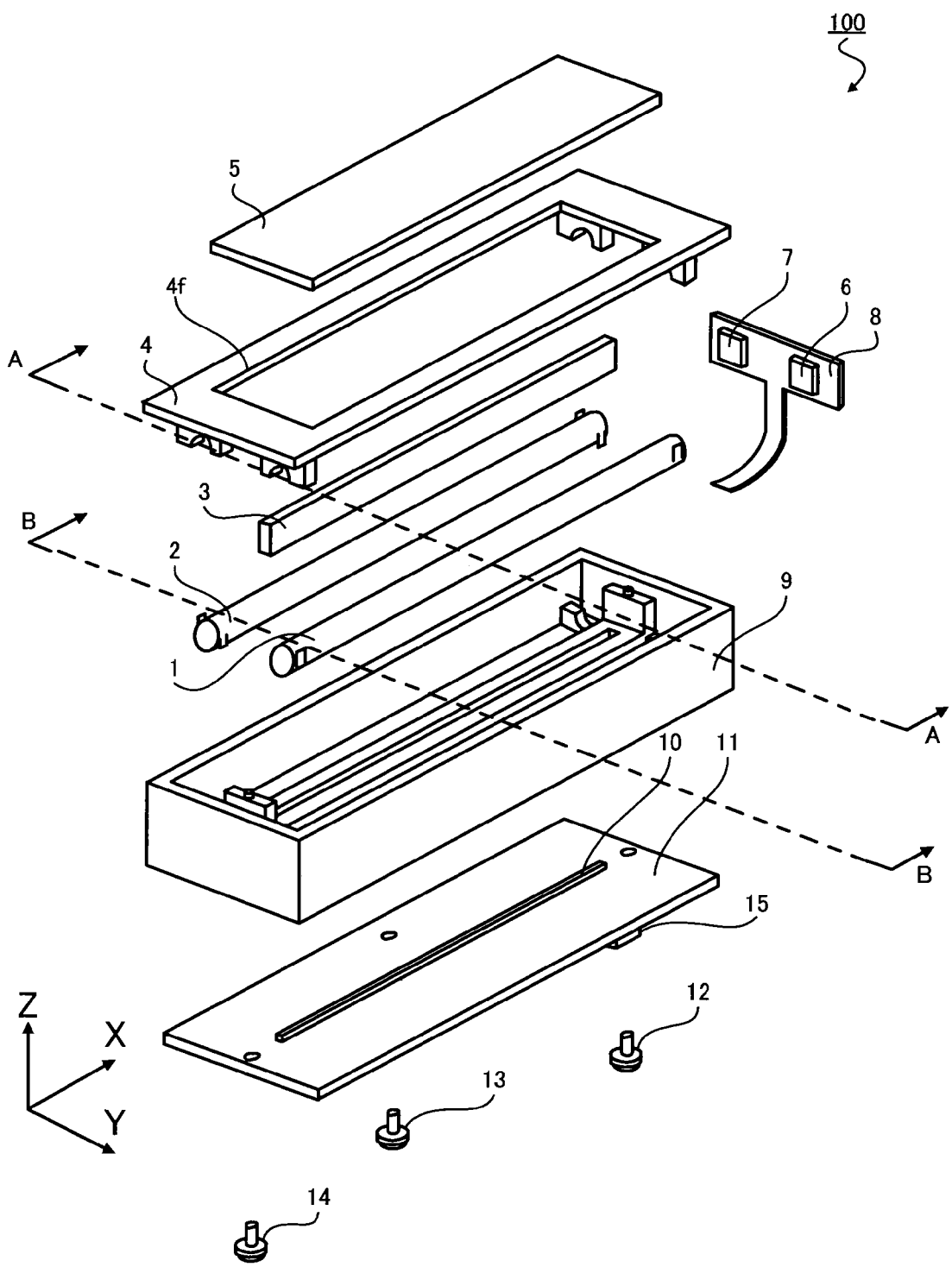
FIG. 1 is an exploded perspective view of an image sensor unit according to an embodiment of the present disclosure.

First, the configuration of the image sensor unit 100 according to the embodiment of the present disclosure is described with reference to FIG. 1. FIG. 1 is an exploded perspective view of the image sensor unit 100. The image sensor unit 100 includes light guides 1 and 2, a lens 3, a cover 4, a transparent plate 5, light sources 6 and 7, light source board 8, a frame 9, a line sensor 10, a sensor boards 11, a fastening member 12, 13 and 14, and a connector 15.

In FIG. 1, the lengthwise direction of the image sensor unit 100 is X-direction, the breadthwise direction of the image sensor unit 100 is Y-direction, and the thickness direction of the image sensor unit 100 is Z-direction. The X-direction is the main scanning direction of the image sensor unit 100. Also, the main scanning direction is the read width direction of the image sensor unit 100. The Y-direction is the sub-scanning direction of the image sensor unit 100. Also, the sub-scanning direction is the conveyance direction of the image sensor unit 100 or the subject to be read. The Z-direction is the optical axis direction (focus depth direction) of the lens 3. The X-direction, the Y-direction, and the Z-direction are orthogonal to each other.

The light guide 1 is a substantially circular columnar shaped component formed from transparent resin. The side surface of the light guide 1 is cylinder shaped and the end surfaces of the light guide 1 are circle shaped. The distance between the two end surfaces of the light guide 1 is longer sufficiently than the diameter of the end surface of the light guide 1. In other words, the cross section of the light guide 1 is basically a circle and is rod-shaped. The light guide 1 is disposed in the image sensor unit 100 such that the lengthwise direction of the light guide 1 substantially coincides with the lengthwise direction of the image sensor unit 100. The light guide 1 emits light from the side surface that is supplied from the end surface thereof. The light guide 1 constitutes as a light-emitting section of the image sensor unit 100.

The light guide 2 is a substantially circular columnar shaped component formed from transparent resin. The side surface of the light guide 2 is cylinder shaped and the end surfaces of the light guide 2 are circle shaped. The distance between the two end surfaces of the light guide 2 is longer sufficiently than the diameter of the surface of the light guide 2. In other words, the cross section of the light guide 2 is basically a circle and is rod-shaped. The light guide 2 is disposed in the image sensor unit 100 such that the lengthwise direction of the light guide 2 substantially coincides with the lengthwise direction of the image sensor unit 100. The light guide 2 emits light from the side surface thereof that is supplied from the end surface thereof. The light guide 2 constitutes as a light-emitting section of the image sensor unit 100.

The light guide 1 and the light guide 2 are disposed in the image sensor unit 100 in relationship to the XZ plane between the light guide 1 and the light guide 2 in a mirror image relationship, so as to be aligned with one another along the Y-axis.

The lens 3 is a line sensor composed of a rod lens array. The rod lens array, which includes a lot of equal magnification rod lenses arranged in a predetermined direction, is fixed by a frame body, or the like. In the embodiment of the present disclosure, to ease understanding, the lens 3 is shown in the diagrams as a box-like outline shape that is thin and long in the main scanning direction. The lens 3 is disposed in the image sensor unit 100 such that the lengthwise direction of the lens 3 coincides with the main scanning direction of the image sensor unit 100. The lengthwise direction of the lens 3 is the direction in which the rod lenses are arranged. The lens 3 converges light reflected by the surface of the subject to be read, the light output from the light guide 1 and the light guide 2. Therefore, the focal point of the lens 3 can be focused on the conveyance surface of the subject to be read.

Figure 2:
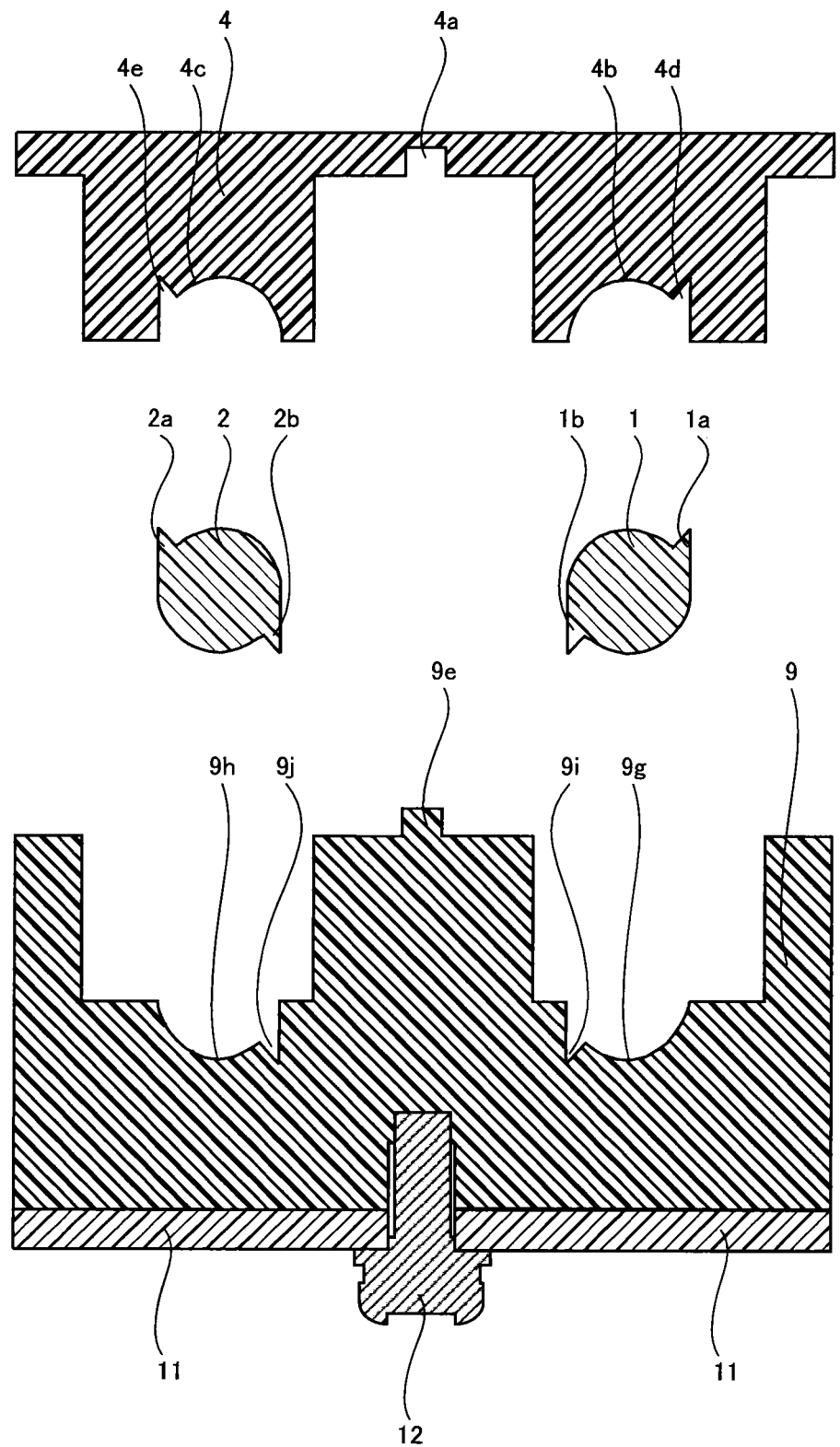
FIG. 2 is a cross-sectional view along the A-A cross-section of the image sensor unit according to the embodiment of the present disclosure.
Figure 3:
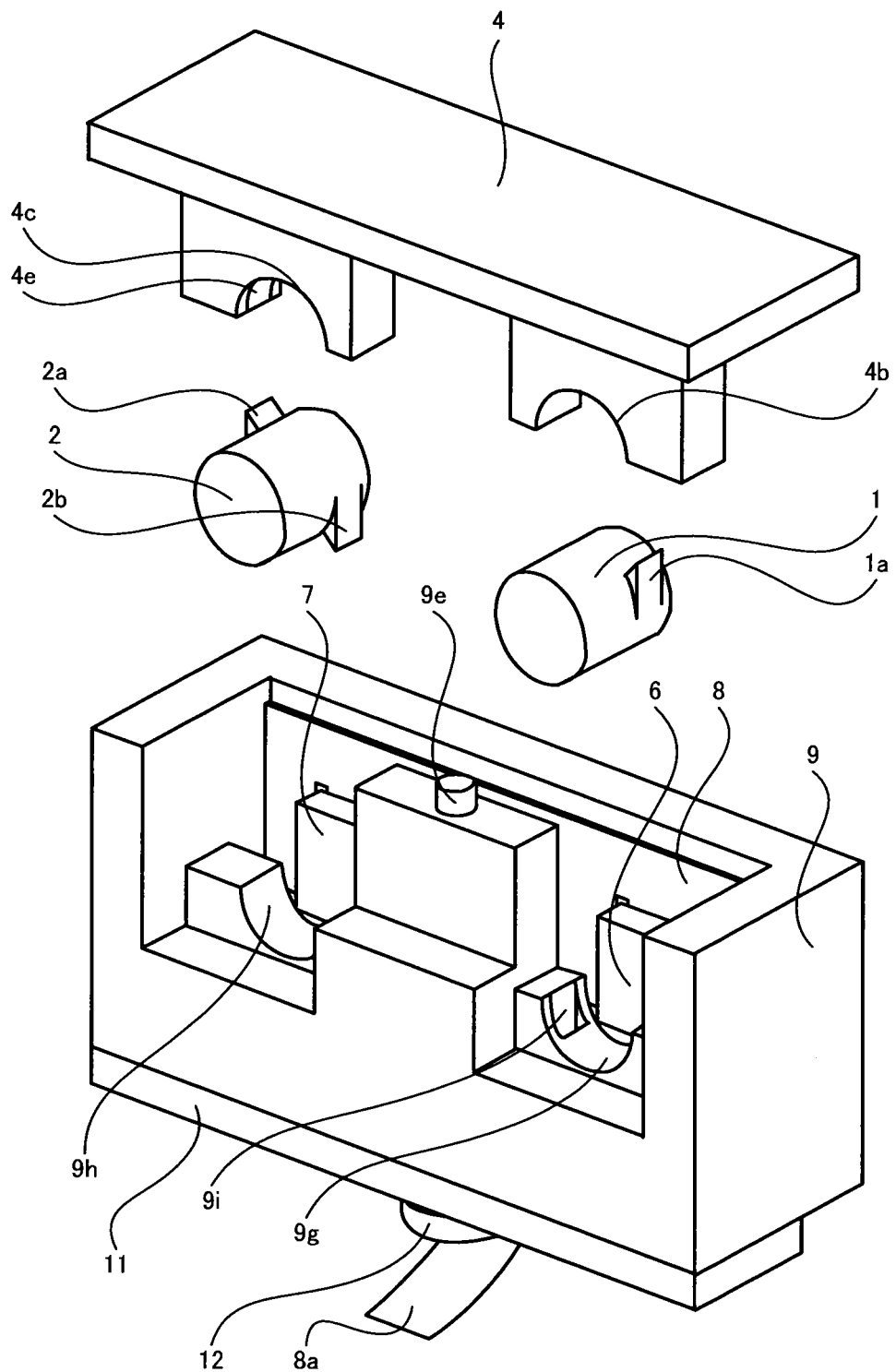
FIG. 3 is an enlarged perspective view in the lengthwise direction of an end portion of the image sensor unit according to an embodiment of the present disclosure.

The cover 4 is a substantially frame-shaped component that is formed from resin. The cover 4 is formed with a through-hole section into which the transparent plate 5 is fitted. In addition to the frame, the cover 4 includes a fitting part for the light guide 1 and the light guide 2 in vicinity of the end portion in the lengthwise direction of the frame. The fitting part protrudes in the Z-direction. The configuration of the cover 4 is described in detail hereinafter with reference to FIGS. 2 and 3. The FIG. 2 is an exploded A-A cross-sectional view of the image sensor unit 100 as shown in FIG. 1. FIG. 3 is an enlarged perspective view in the lengthwise direction of the end portion of the image sensor unit 100.

As shown in FIGS. 1, 2, and 3, the cover 4 includes a positioning hole 4a, light guide holders 4b and 4c, notches 4d and 4e, and, a transparent plate holder 4f. The positioning hole 4a is a hole that determines the position of the cover 4 when installing the cover 4 onto the frame 9. The light guide holder 4b is the portion for being fitted with in the light guide 1 and holding the light guide 1. The light guide holder 4c is the portion for being fitted with in the light guide 2 and holding the light guide 2. The notch 4d is a notch for preventing the light guide 1 from deviating while the light guide 1 is held by the light guide holder 4b. The notch 4e is a notch for preventing the light guide 2 from deviating when the light guide 2 is held by the light guide holder 4c. The transparent plate holder 4f is the portion for holding the transparent plate 5. The light guide holder 4b also has a function to block light, emitted from the light source 6, not to reach the surface of the subject to be read or the line sensor 10 without passing through the light guide 1. The light guide holder 4c also has the function to block light, emitted from the light source 7 not to reach the surface of the subject to be read or the line sensor 10 without passing through the light guide 2.

The transparent plate 5 is a plate-like component formed from glass or transparent resin. The transparent plate 5 is fitted in the through-hole formed on the cover 4. The cover 4 into which the transparent plate 5 is fitted is a substantially plate-like component, and has a surface that is in close contact with the surface of the subject to be read such as a document or paper money. The cover 4 into which the transparent plate 5 is fitted also acts as a cover for covering one of the openings of the frame 9.

The light source 6 includes light source elements such as an LED (Light Emitting Diode) light source that emits light toward one end surface of the light guide 1. The light source 6 is mounted onto the light source board 8.

The light source 7 includes light source elements such as an LED light source that emits light toward one end surface of the light guide 2. The light source 7 is mounted onto the light source board 8.

The light source board 8 is a board onto which the power source 6 and the power source 7 are mounted, and includes a circuit that drives the light source 6 and the light source 7. The light source 6 and the light source 7 are mounted onto the light source board 8 such that the light source 6 and the light source 7 are arranged along the Y-direction.

The frame 9 is a substantially frame-shaped component made of resin. The frame 9 is formed by arranging the component that supports the cover 4 along the X-direction in vicinity of both edges in the lengthwise direction of one of the openings of the frame 9. The frame 9 configuration is described in detail hereinafter with reference to FIGS. 2, 4, and 7.

Figure 4:
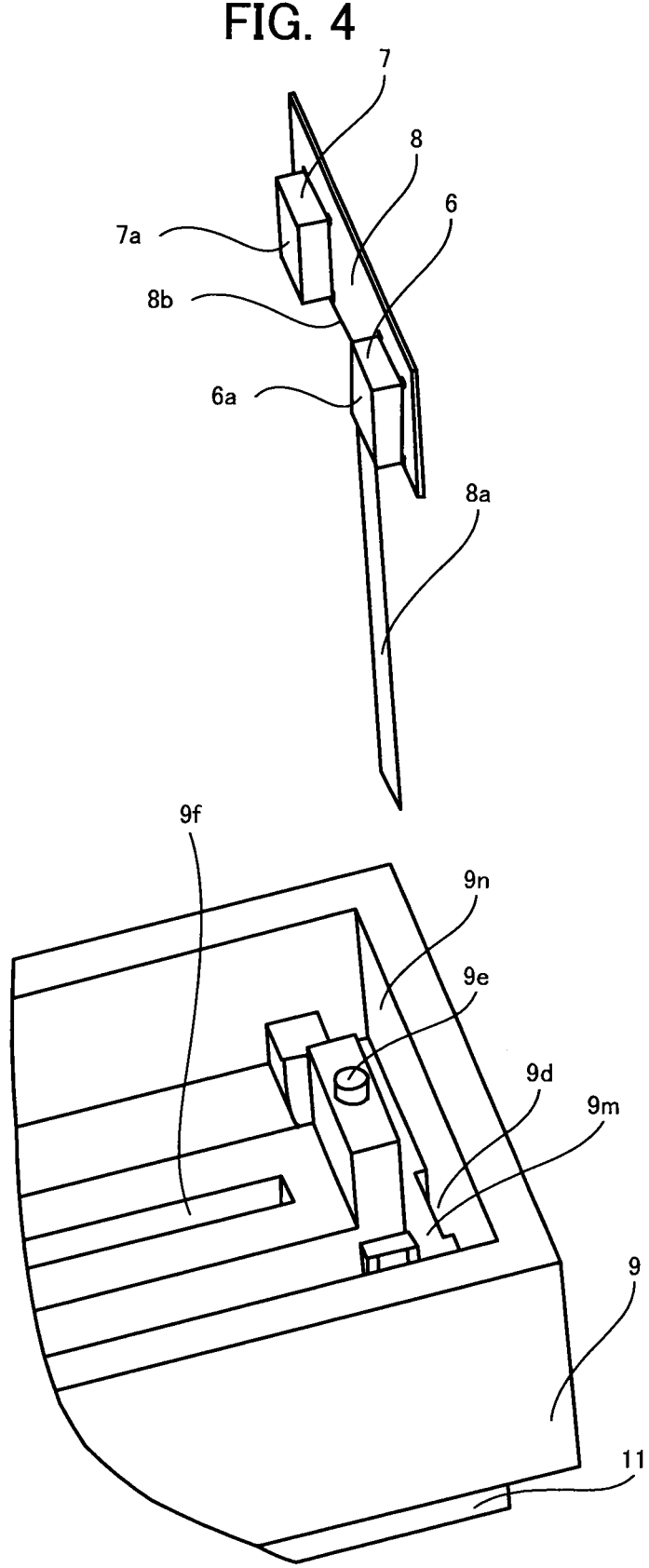
FIG. 4 is a diagram indicating a method of fixing a light source board to a frame.
Figure 7:
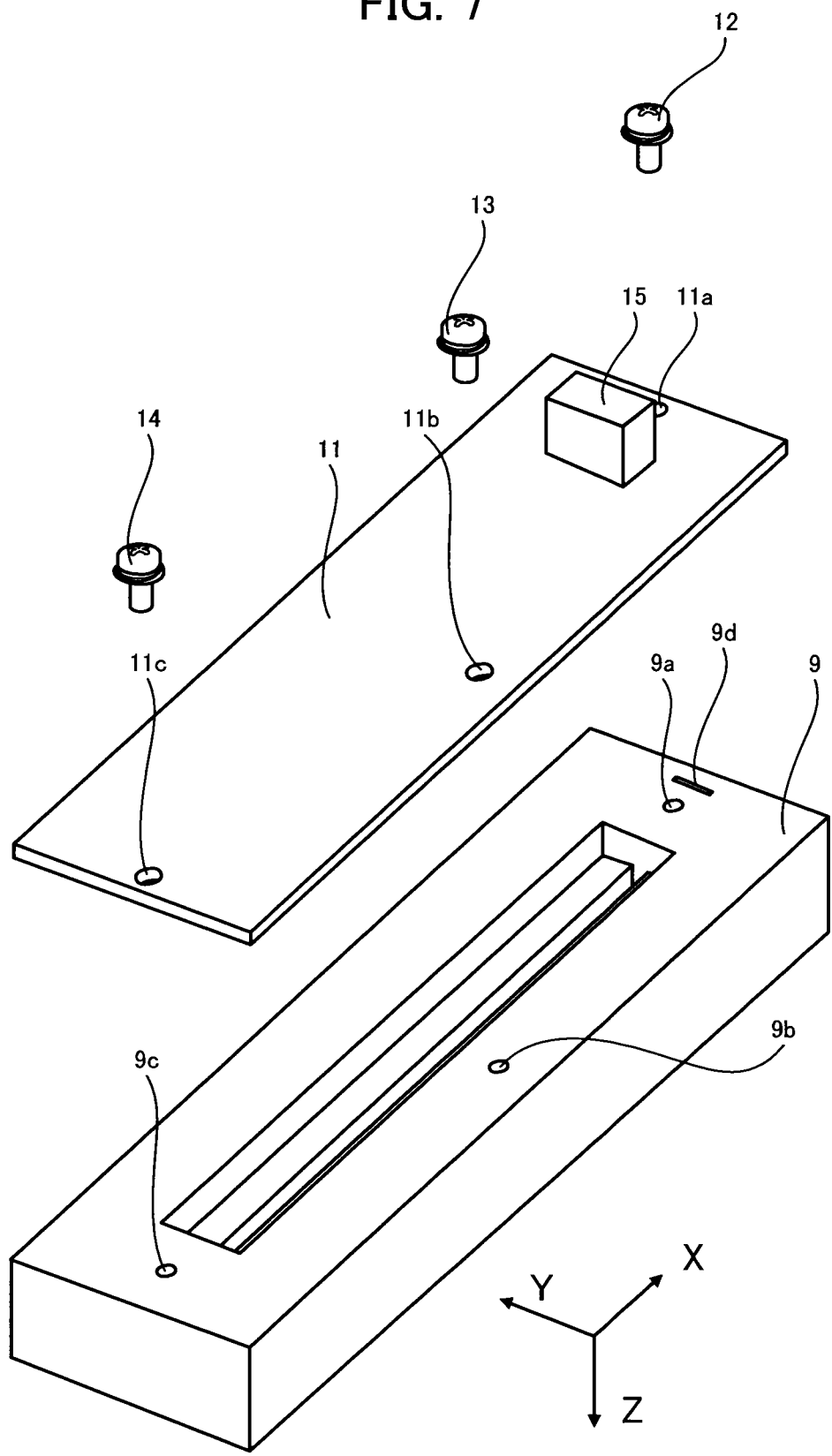
FIG. 7 is an exploded perspective view showing a sensor board, the frame, and fastening members.

As shown in FIGS. 2, 4, and 7, the frame 9 includes insertion holes 9a, 9b, and 9c, an insertion through-hole 9d, a positioning protrusion 9e, a groove 9f, light guide holders 9g and 9h, and notches 9i and 9j. The insertion holes 9a, 9b, and 9c are holes for installing the sensor board 11 onto the frame 9 using fastening members 12, 13, and 14. The insertion through-hole 9d is a through-hole for passing an inserting section 8a formed on the light source board 8 through the frame 9 to the side, on which the sensor board 11 is mounted, of the frame 9. The positioning protrusion 9e is a protrusion for positioning the cover 4 when installing the cover 4 onto the frame 9. The groove 9f is a groove into which the lens 3 is inserted.

The light guide holder 9g is the portion into which the light guide 1 is fitted thereby holding the light guide 1. The light guide holder 9h is the portion into which the light guide 2 is fitted, thereby holding the light guide 2. The notch 9i is a notch for preventing the light guide 1 from deviating while the light guide 1 is held in the light guide holder 9g. The notch 9j is a notch for preventing the light guide 2 from deviating while the light guide 2 is held by the light guide holder 9h. The light guide holder 9g also has the function to block light, emitted from the light source 6, not to reach the surface of the subject to be read or the line sensor 10 without passing through the light guide 1. The light guide holder 9h also has the function to block light, emitted from the light source 7, not to reach the surface of the subject to be read or the line sensor 10 without passing through the light guide 2.

The line sensor 10 includes a light-receiving element array. The light-receiving element array, which includes a light-receiving element (sensor IC (Integrated Circuit)) arranged in a predetermined direction for reading the light converged by the lens 3 through photoelectric conversion, is fixed by a frame body or the like. In the embodiment of the present disclosure, to ease understanding, the line sensor 10 is shown in the diagrams as a box-like outline shape that is thin and long in the main scanning direction. The line sensor 10 is disposed on the sensor board 11 such that the lengthwise direction of the line sensor 10 coincides with the lengthwise direction of the sensor board 11. The lengthwise direction of the line sensor 10 is the direction in which the light-receiving elements are arranged. Also, the length of the line sensor 10 in the lengthwise direction is the reading length.

The sensor board 11 includes the line sensor 10 mounted onto one side thereof and the connector 15 mounted onto the opposite side thereof. The sensor board 11 includes a circuit and the like for processing electrical signals supplied by the line sensor 10 and providing processed electrical signals from the connector 15 to the outside. The sensor board 11 is fixed to the frame 9 such that the lengthwise direction of the sensor board 11 coincides with the main scanning direction of the image sensor unit 100. The sensor board 11 is a cover that covers the other opening of the frame 9.

The fastening members 12, 13, and 14 are member for fixing the sensor board 11 to the frame 9. The fastening members 12, 13, and 14 are for example, screws, pins, or rivets.

The connector 15 outputs electrical signals, which are generated through photoelectric conversion by the line sensor 10 mounted onto the sensor board 11, as image signals to the outside.

The external appearance of the image sensor unit 100 is described hereinafter with reference to FIGS. 5 and 6.

Figure 5:
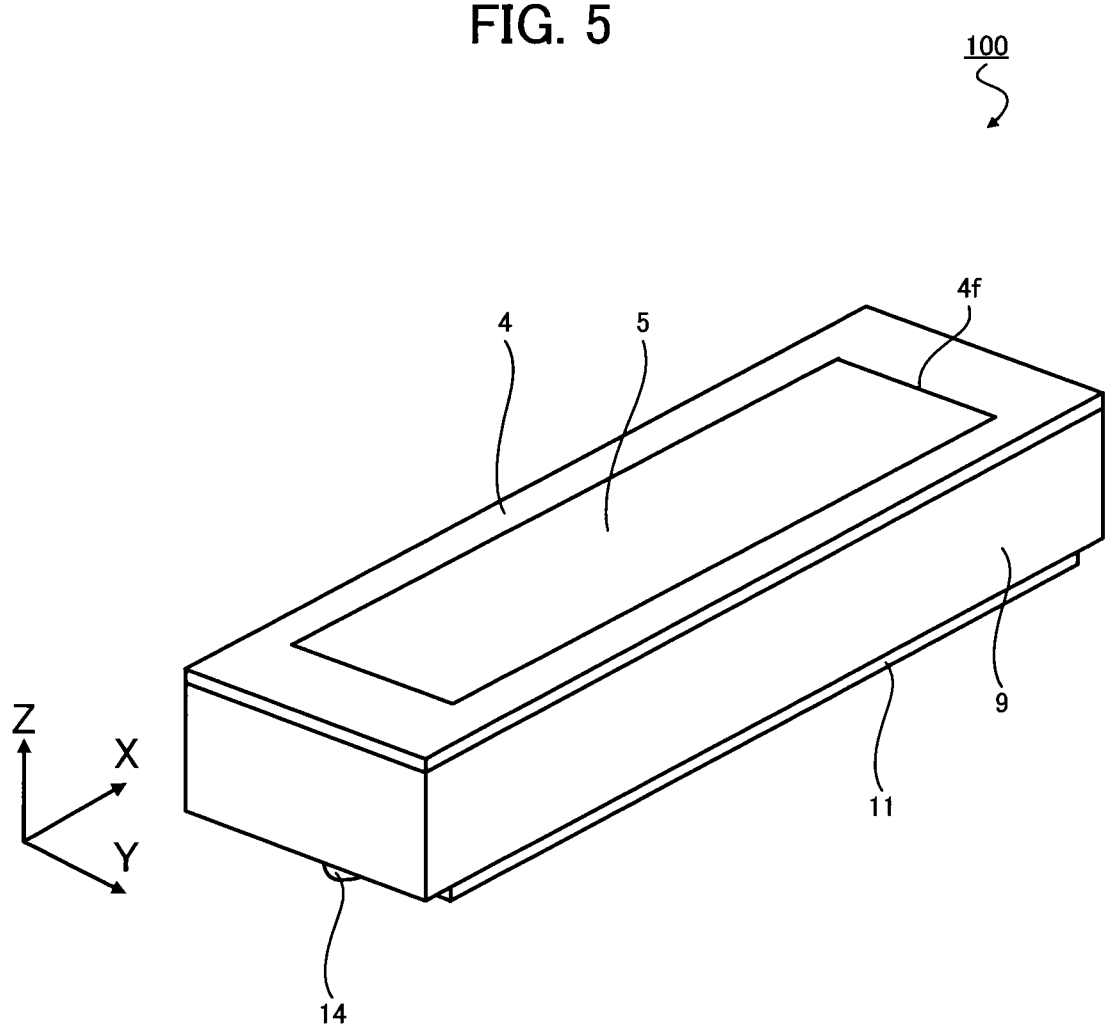
FIG. 5 is a first external view of the image sensor unit according to the embodiment of the present disclosure.

FIG. 5 is a first external view of the image sensor unit 100. As shown in FIG. 5, the image sensor unit 100 includes a substantially rectangle-shaped casing. The casing is composed of the frame 9 that is frame shaped, a cover covering one opening of the frame 9 and composed of the cover 4 and the transparent plate 5, and a cover covering the other opening of the frame 9 and composed of the sensor board 11. The cover 4 includes the transparent plate holder 4f that holds the transparent plate 5. A variety of methods can be employed as a method of holding the transparent plate 5 with the cover 4. For example, the cover 4 and the transparent plate 5 can be adhered together using resin. Alternatively, fixing can be achieved by forming the cover 4 and the transparent plate 5 integrally.

Figure 6:
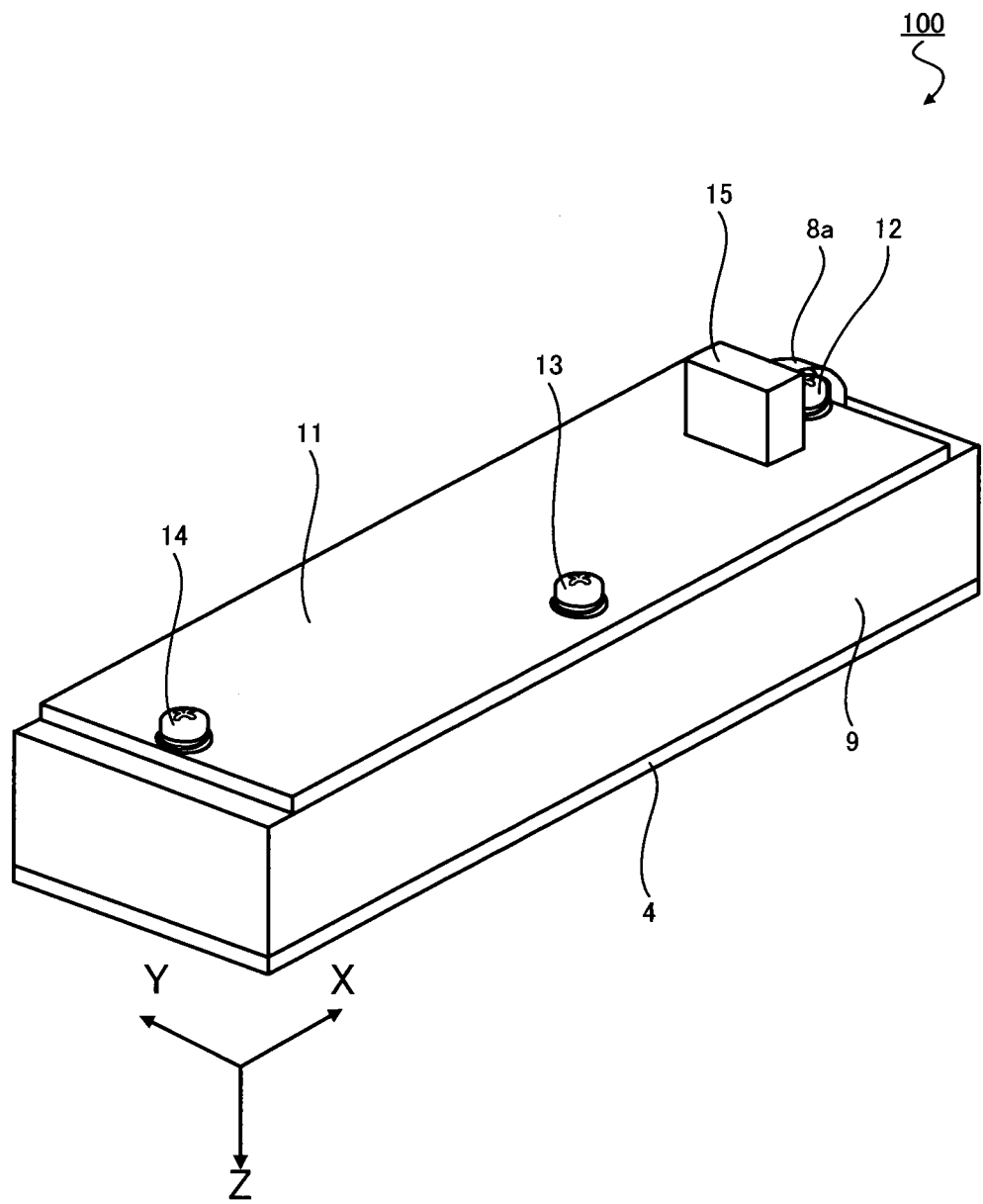
FIG. 6 is a second external view of the image sensor unit according to the embodiment of the present disclosure.

FIG. 6 is a second external view of the image sensor unit 100. Specifically, the external view of the image sensor unit 100 in FIG. 6 is the image sensor unit 100 of FIG. 5 rotated 180° around the X-axis. As shown in FIG. 6, the connector 15 to which the inserting section 8a is connected is fixed to the outside surface of the sensor board 11. Also, the sensor board 11 is fixed to the frame 9 by the fastening members 12, 13, and 14.

The method of fixing the sensor board 11 to the frame 9 is described hereinafter with reference to FIG. 7. FIG. 7 is an exploded perspective view showing the sensor board 11, the frame 9, and the fastening members 12, 13 and 14.

The frame 9 is formed with the insertion holes 9a, 9b, and 9c, and the insertion through-hole 9d. Also, the sensor board 11 is formed with insertion through-holes 11a, 11b, and 11c. The position of the sensor board 11 is fixed in the X-direction, the Y-direction, and the Z-direction by screwing the fastening member 12, which passes through the insertion through-hole 11a, into the insertion hole 9a. In this case, since the surrounding area of the insertion through-hole 11a of the sensor board 11 is pushed against the frame 9 by the fastening member 12, the position of the sensor board 11 is fixed in the Z-direction. Also, the surrounding area of the insertion through-hole 11a of the sensor board 11 is fixed in the X-direction and the Y-direction, because the penetrating portion of the fastening member 12 passes through the insertion through-hole 11a having an inside diameter slightly larger than the outside diameter of the penetrating portion.

In this case, the sensor board 11 can be moved freely only in a circumferential direction around an axis extending in the Z-direction and passing through the fastening member 12. Here, when the fastening members 13 and 14 are also passed through the insertion through-holes 11b and 11c and screwed into the insertion holes 9b and 9c, the sensor board 11 is restricted from moving in the circumferential direction around the axis extending in the Z-direction and passing through the fastening member 12.

Here, both the insertion through-hole 11a and the insertion through-hole 11c formed on both end surfaces of the sensor board 11 are positioned on an extension line of the light receiving line of the line sensor 10 extending in the X-direction. Also, both the insertion hole 9a and the insertion hole 9c formed on both end surfaces of the frame 9 are positioned on an extension line of the light receiving line of the line sensor 10 extending in the X-direction. By positioning the fastening portion of the frame 9 and the sensor board 11 in such a fashion, the distance in the Z-direction from the lens 3 to the line sensor 10 is kept to be constant regardless of the position in the X-direction. The reason for this is that the linear portion that connects the two fastening portion (the linear portion that connects the insertion through-hole 11a and the insertion through-hole 11c) of the sensor board 11 is made to be hardly warped in the Z-direction. In this way, according to the present embodiment, the line sensor 10 can be fixed accurately in the Z-direction in the focal point position of the lens 3 which is crucial for achieving sufficient performance.

The method of fixing the light source board 8 to the frame 9 is described hereinafter with reference to FIGS. 4 and 8. As shown in FIG. 4, the light source board 8 is a flexible board onto which the light source 6 and the light source 7 are mounted. The heat generated from light emitted from light source 6 and the light source 7 is conducted to the frame 9 via the light source board 8 and further discharged into the atmosphere from the frame 9. The light source board 8 includes the inserting section 8a for attaching to the connector 15 along with fixing the light source board 8 to the frame 9.

First, the surface opposite to the surface on which the light source 6 and the light source 7 of the light source board 8 is brought into contact with a light source board contact surface 9n, which is the surface on the inner side provided at one end portion in the main scanning direction of the frame 9, thereby determining the position in the X-direction of the light source board 8. Also, a bottom surface 8b of the light source board 8 is brought into contact with a light source board bottom contact surface 9m of the frame 9, thereby determining the position in the Z-direction of the light source board 8. Here, the width in the Y-direction of the inserting section 8a is slightly narrower than the width in the Y-direction of the insertion through-hole 9d formed on the frame 9. Thus, the position in the Y-direction of the light source board 8 is determined by passing the inserting section 8a through the insertion through-hole 9d.

Figure 8:
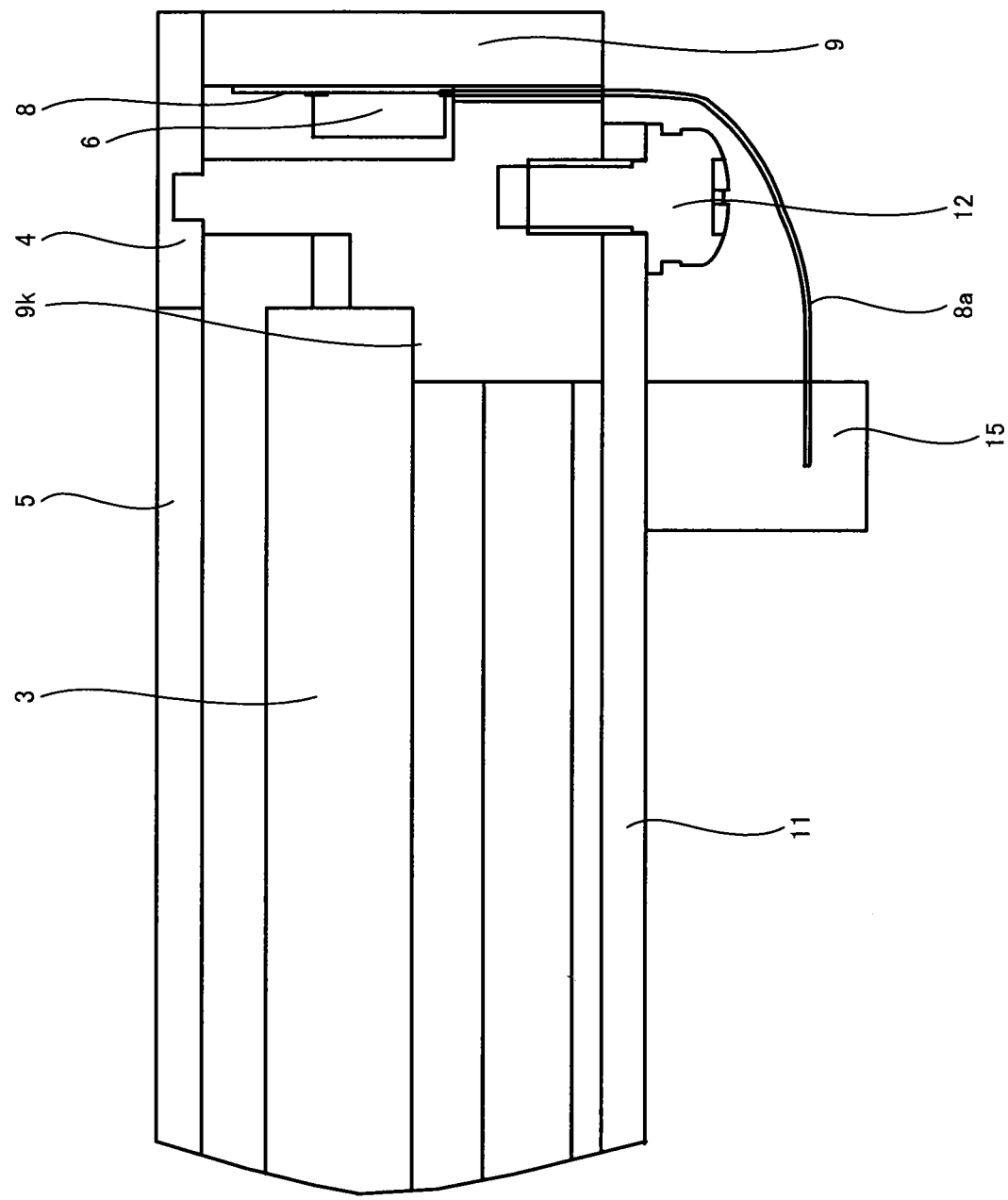
FIG. 8 is a diagram schematically showing the section in vicinity of a light guide holder as viewed from the Y-direction.

FIG. 8 is a diagram schematically showing the section in vicinity of the light guide holder of the image sensor unit 100 as viewed from the Y-direction. As shown in FIG. 8, the portion of inserting section 8a that passes through the insertion through-hole 9d extends above the fastening member 12 and is connected to the connector 15 mounted onto the sensor board 11. In such a configuration, when the light source board 8 is connected to the connector 15, the length in the lengthwise direction of the image sensor unit 100 can be prevented from becoming longer.

Figure 9:
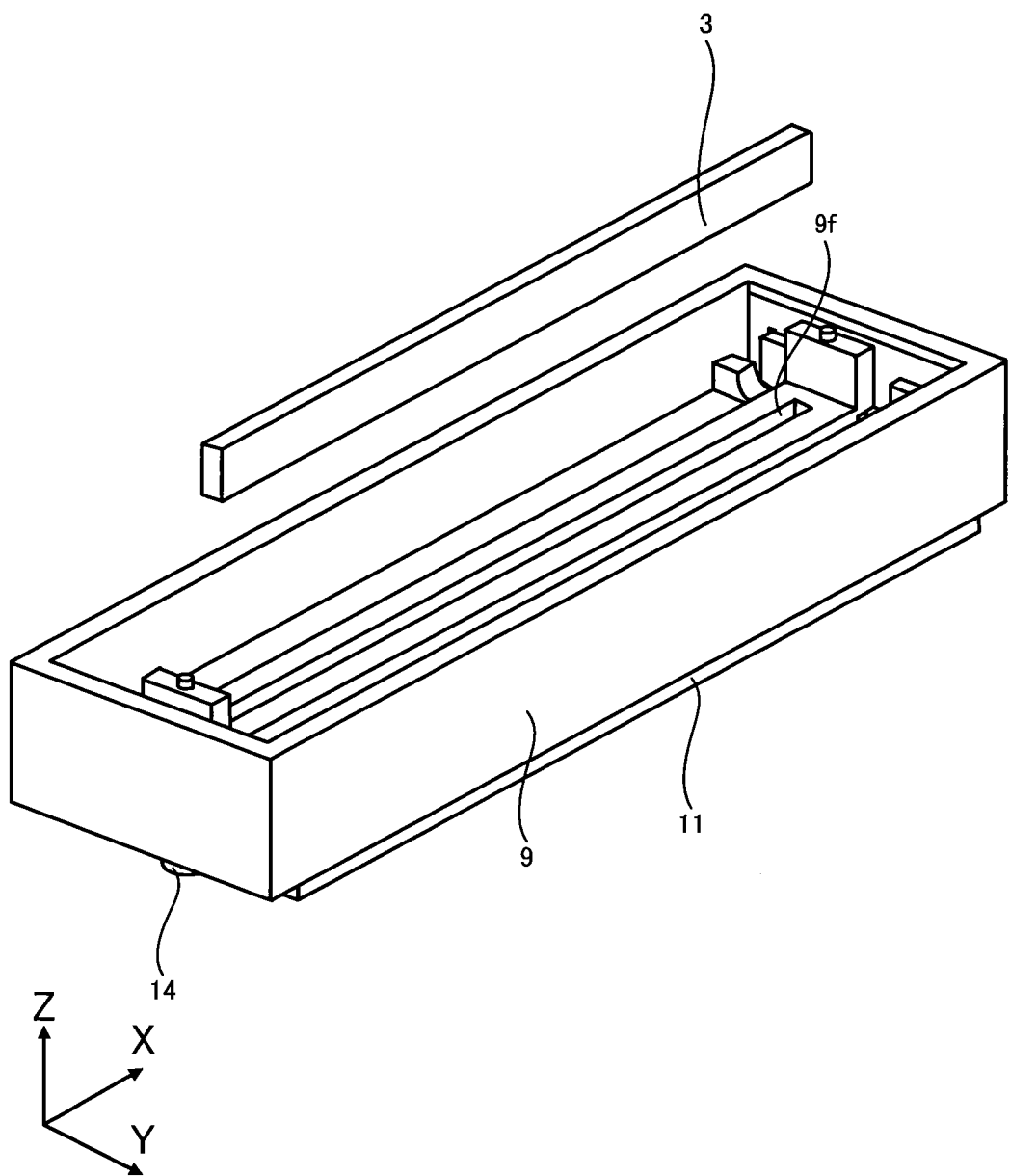
FIG. 9 is an exploded perspective view showing a lens and the frame.

The method of fixing the lens 3 to the frame 9 is described hereinafter with reference to FIG. 9. FIG. 9 is an exploded perspective view showing the lens 3 and the frame 9. The lens 3 is inserted into the grove 9f provided in the frame 9 and is fixed by a resin or the like. Therefore, it is preferred that the width in the Y-direction of the lens 3 is equal to or slightly narrower than the width in the Y-direction of the groove 9f. Also, it is preferred that the length in the X-direction of the lens 3 is equal to or slightly shorter than the length in the X-direction of the groove 9f. The width (depth of the groove) in the Z-direction of the groove 9f is determined based on the distance from the lens 3 inserted into the groove 9f to the conveyance surface or the line sensor 10.

The method of fixing the light guides 1 and 2 to the frame 9 is described in detail hereinafter with reference to the FIG. 2. The A-A cross section is a plane passing on the center of protrusions 1a, 1b, 2a, and 2b, the positioning hole 4a, the insertion hole 9a, the positioning protrusion 9e, the notches 9i and 9j, the insertion through-hole 11a, the fastening member 12, and the like, and the plane is parallel to the YZ plane.

As shown in FIG. 2, the light guide 1 is sandwiched and held by the light guide holder 4b provided in the cover 4 and the light guide holder 9g provided in the frame 9. This fixes the position in the Y-direction and the position in the Z-direction of the light guide 1. In this case, the protrusion 1a provided in the light guide 1 is inserted into the notch 4d provided in the cover 4, and the protrusion 1b provided in the light guide 1 is inserted into the notch 9i provided in the frame 9. As a result, the light guide 1 is prevented from rotating around the axis extending in the X-direction. Also, the width in the X-direction of the protrusion 1a is equal to or slightly shorter than the width in the X-direction of the notch 4d, and the width in the X-direction of the protrusion 1b is equal to or slightly shorter than the width in the X-direction of the notch 9i. Thus, the position is also fixed in the X-direction of the light guide 1.

Also, as shown in FIG. 2, the light guide 2 is sandwiched and held by the light guide holder 4c provided in the cover 4 and the light guide holder 9h provided in the frame 9. This secures the position in the Y-direction and the position in the Z-direction of the light guide 2. In this case, the protrusion 2a provided in the light guide 2 is inserted into the notch 4e provided in the cover 4, and the protrusion 2b provided in the light guide 2 is inserted into the notch 9j provided in the frame 9. As a result, the light guide 2 is prevented from rotating around the axis extending in the X-direction. Also, the width in the X-direction of the protrusion 2a is equal to or slightly shorter than the width in the X-direction of the notch 4e, and the width in the X-direction of the protrusion 2b is equal to or slightly shorter than the width in the X-direction of the notch 9j. As a result, the position in the X-direction of the light guide 2 is also fixed.

Also, the press-fitting together of the positioning hole 4a formed on the cover 4 and the positioning protrusion 9e formed on the frame 9, secures the position in the relative X-direction of the cover 4 corresponding to the frame 9 and the position in the relative Y-direction of the cover 4 corresponding to the frame 9.

Here, the two positioning holes 4a one each formed on both ends of the cover 4 are both positioned on an extension line of the light receiving line of the line sensor 10 extending in the X-direction. Also, the two positioning protrusions 9e each formed on both ends of the frame 9 are positioned on an extension line of the light receiving line of the line sensor 10 extending in the X-direction. The portions of the frame 9 and the cover 4 press-fitted together in such a position keeps the distance fixed in the Z-direction from the lens 3 to the transparent plate 5 regardless of the position in the X-direction. The reason for this is that the linear portion that connects two press-fitted together portions (the linear portion that connects the two positioning holes 4a) provided on both ends of the cover 4 is made to be hardly warped in the Z-direction. In this way, according to the present embodiment, the conveyance surface that is in close contact with the transparent plate 5 can be fixed accurately in the Z-direction in the focal point position of the lens 3 which is important for achieving sufficient performance.

Figure 10:
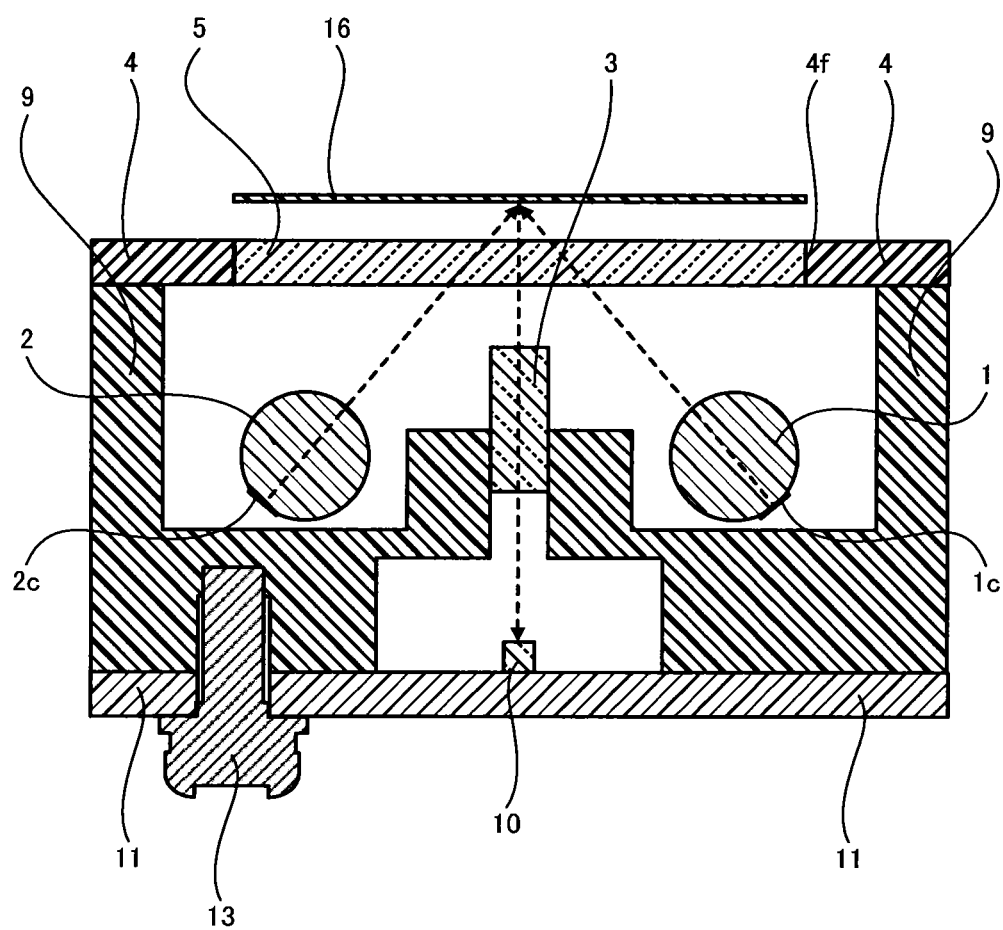
FIG. 10 is a cross-sectional view along the B-B cross section of the image sensor unit according to the embodiment of the present disclosure.

The way in which the light emitted from the light sources 6 and 7 is received by the line sensor 10 is described hereinafter with reference to FIGS. 10 and 11. FIG. 10 is a cross-sectional view taken along the B-B cross section of the image sensor unit 100 of FIG. 1. The B-B cross section is a plane passing on the center of the insertion hole 9b, the insertion through-hole 11b, the fastening member 13, and the like, and the plane is parallel to the YZ plane.

As shown in FIG. 10, the light emitted from a scattering zone 1c of the light guide 1 and a scattering zone 2c of the light guide 2, are reflected by the surface of the subject to be read 16, and converged to the line sensor 10 via the lens 3. In FIG. 10, the light emitted from the light guides 1 and 2 toward the subject to be read 16 is shown by a dashed-line arrow, and the light reflected by the subject to be read 16 that are converged to the line sensor 10 via the lens 3 is shown by the dashed-line arrow. The dashed-line arrow pointing from the subject to be read 16 toward the line sensor 10 indicates the light axis of the lens 3.

Also, as shown in FIG. 10, the cover 4 and the transparent plate 5 are placed in between the light guide 1 or the light guide 2 and the subject to be read 16. The cover 4 and the transparent plate 5 prevent the inside of the frame 9 from being contaminated with debris outside of the frame 9. The transparent plate 5 is configured to be made of transparent materials in order to minimize the attenuation of the light (line light source) emitted from the light guides 1 and 2 as well as light reflected by the subject to be read 16.

The light guide 1 and the light guide 2 transmit light emitted to the end surfaces thereof in the main scanning direction (read width direction) and irradiate the subject to be read 16 with linear beam light parallel to the main scanning direction. The positioning in the frame 9 of the light guides 1 and 2 and the positioning of the scattering zones 1c and 2c within the light guides 1 and 2 (optical design) are determined by considering the refraction of light by the transparent plate 5 so that the linear beam light irradiates appropriately the subject to be read 16.

FIG. 11 is a diagram explaining the path of the light emitted from the light source 6 to the subject to be read 16. FIG. 11 schematically shows the section in vicinity of the light guide holder of the image sensor unit 100 as viewed from the Y-direction.

As shown in FIG. 11, the light emitted from the light source 6 toward the end surface of the light guide 1 is reflected repeatedly by the wall surface of the light guide 1 while propagating in the lengthwise direction of the light guide 1 inside the light guide 1. In this diagram, the scattering zone 1c in the light guide 1 is configured to have a pattern that is either a white printing pattern or a convex-concave pattern formed in the lengthwise direction of the light guide 1. When the light propagating in the light guide 1 reaches the scattering zone 1c, the light is scattered in the scattering zone 1c and emits from the portion of the surface facing the scattering zone 1c. As a result, the linear beam light emits toward the subject to be read 16 from the surface facing the scattering zone 1c.

Although not shown in the diagram, likewise, the light emitted from the light source 7 toward the end surface of the light guide 2 is reflected repeatedly by the wall surface of the light guide 2 while propagating in the lengthwise direction of the light guide 1 inside the light guide 2. The scattering zone 2c in the light guide 2 is configured to have a pattern that is either a white printing pattern or a convex-concave pattern formed in the lengthwise direction of the light guide 2. When the light propagating in the light guide 2 reaches the scattering zone 2c, the light is scattered in the scattering zone 2c and is emitted from the portion of the surface facing the scattering zone 2c. As a result, the linear beam light is emitted toward the subject to be read 16 from the surface facing the scattering zone 2c.

In FIG. 11, the dashed-line arrow pointing from the light guide 1 toward the subject to be read 16 shows the main light path of the light reflected by the scattering zone 1c and irradiating the subject to be read 16.

While the light guide 1 is held by the cover 4 and the frame 9, the end surface of the light guide 1 faces a light emitting surface 6a of the light source 6. Also, light can pass through between the end surface of the light guide 1 and the light emitting surface 6a of the light source 6. Likewise, while the light guide 2 is held by the cover 4 and the frame 9, the end surface of the light guide 2 faces a light emitting surface 7a of the light source 7. Also, light can pass through between the end surface of the light guide 2 and the light emitting surface 7a of the light source 7.

Next, the manufacturing process (manufacturing method) of the image sensor unit 100 is described below. The manufacturing process of the image sensor unit 100, as basic steps, includes a step of assembling a cover, a step of arranging a light-receiving section, a step of fixing a sensor board, a step of arranging a lens, and a step of mounting an illumination device. The image sensor unit 100 is basically a symmetrical configuration with the plane passing on the center of the image sensor unit 100 as a boundary, the plane being parallel to the XZ plane. Therefore, hereinafter, only the configuration elements one side is described.

The cover assembling step is a step of fixing the transparent plate 5 to the transparent plate holder 4f provided on the cover 4. The transparent plate holder 4f is a squarely-cut-out center part of the cover 4. The fixing method can be a fixing method in which adhering is done using resin, or can be a fixing method in which the cover 4 and the transparent plate 5 are formed integrally. The cover assembling step is carried out generally before the illumination device mounting step.

The light-receiving section arrangement step, is a step in which the light-receiving elements are mounted as the line sensor 10 in the lengthwise direction of the sensor board 11 on the sensor board 11.

The sensor board fixing step is a step in which the sensor board 11 is fixed by fastening members such as screws to the other opening of the frame 9. In this circumstance, the fastening members such as screws are placed in at least two locations along the lens 3.

The lens arrangement step, as shown in FIG. 8, is a step in which the lens 3 is arranged at a position further inside than the position at which the sensor board 11 of the frame 9 is fixed. The lens 3 is held by a lens holder 9k formed on the inside of the frame 9, and is fixed at the opening extending in the main scanning direction. The positioning in the main scanning direction and the sub-scanning direction of the lens 3 can be determined by the opening extending in the main scanning direction or can be determined by the adjusting mechanism provided separately on the frame 9. In the case when it is difficult to install the lens 3 after the illumination device mounting step, installation is preferably performed before the illumination device mounting step.

In the illumination device mounting step, as shown in FIGS. 2 and 4, the surface opposite to the surface on which the light source 6 and the light source 7 of the light source board 8 is brought into contact with the light source board contact surface 9*n* provided on the end portion in the main scanning direction of the frame 9. Also, a bottom surface 8*b* of the light source board 8 is brought into contact with the light source board bottom contact surface 9*m* of the frame 9, thereby determining the position of the light source board 8. Next, the light guide 1 is installed within the light guide holder 9*g* of the frame 9. Here, by press-fitting the protrusion 1*b* of the light guide 1 into the notch 9*i* of the frame 9, the light emitting angle of the light guide 1 is fixed at a fixed angle, and error in irradiation direction of the light guide 1 due to angle error is prevented. Furthermore, the light guide 2 is installed within the light guide holder 9*h* of the frame 9 in the same manner as the light guide 1.

Also, the protrusion 1*a* of the fixed light guide 1 is press-fitted into the notch 4*d* of the cover 4 and the protrusion 2*a* of the fixed light guide 2 is press-fitted into the notch 4*e* of the cover 4. In this case, the light guide 1 is held by being sandwiched between the light guide holder 4*b* of the cover 4 and the light guide holder 9*g* of the frame 9. Likewise, the light guide 2 is held by being sandwiched between the light guide holder 4*c* of the cover 4 and the light guide holder 9*h* of the frame 9. As shown in FIG. 9, the lens arrangement step can be performed in the middle of the illumination device mounting step.

According to the present embodiment, because the cover 4 and the frame 9 is made to carry out the light guide holding role and the light blocking role, the previously-necessary parts are not used, thereby simplifying assembling.

Also, according to the present embodiment, the cover 4 and the sensor board 11 are each fixed to the frame 9 at portions intersecting a plane being orthogonal to the sensor board 11 and passing on a line onto which the line sensor 10 is mounted. The distance from the subject to be read 16 to the lens 3 and the distance from the lens 3 to the line sensor 10 become difficult to be changed. Thus, according to the present embodiment, the image of the subject to be read 16 can be generated accurately.

The method in which a light guide is fixed mechanically inside a frame using an elastic material without an adhesive is known conventionally. However, with such a method, partial or whole deformation caused by heat or external pressure before assembling or after assembling cannot be completely prevented. With such a method, deformations to the image sensor unit can be prevented to a certain extent, deformations of portions that affected greatly accuracy rendered the method unsuitable for practical use.

However, in the image sensor unit 100 according to the present embodiment, the deformation of portions that affect greatly accuracy is prevented. Therefore, according to the image sensor unit 100 according to the present embodiment, accuracy can be maintained when deformation occurs to a portion of the image sensor unit 100.

While the present embodiment of the present disclosure is described above, numerous other variations and modifications are possible and the breadth and scope of the present disclosure is not limited by the above-described embodiment.

In the foregoing embodiment, the light guide is described as having the function of emitting light in only one direction. In the present disclosure, a light guide having the function of emitting light in two or more directions can be employed.

In FIGS. 12A, 12B, 12C, 12D, 12E, and 12F, each are cross-sectional views along the A-A cross section in which a light guide having the function of emitting light in two or more directions is employed as the light guide 2.

Figure 12A:
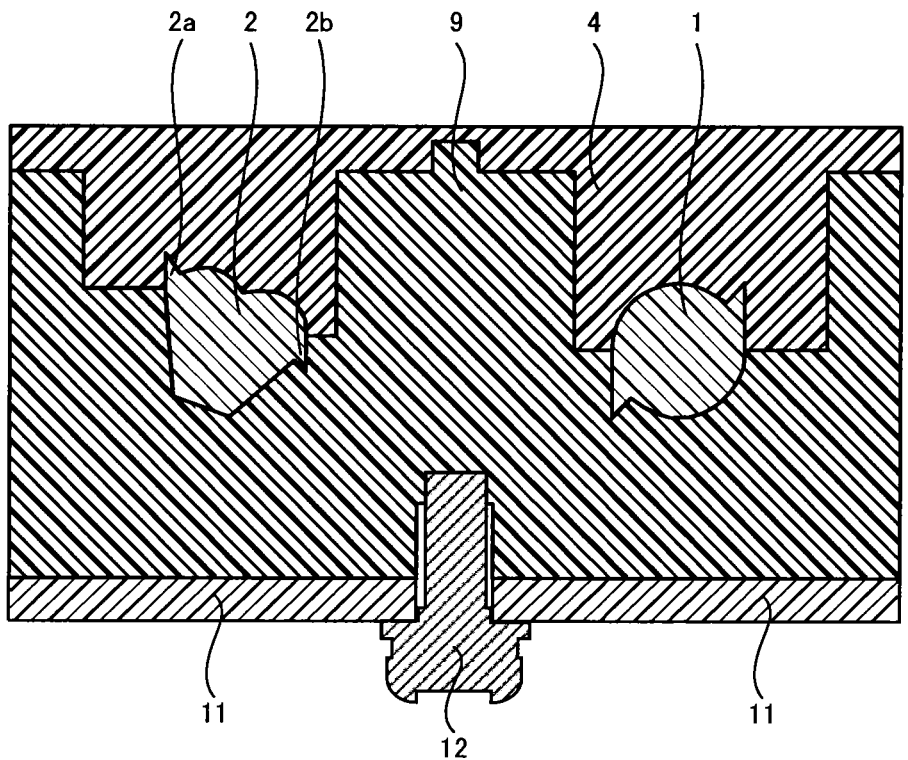
FIG. 12A is a cross-sectional view along line A-A cross section of the image sensor unit according to modification 1.
Figure 12B:
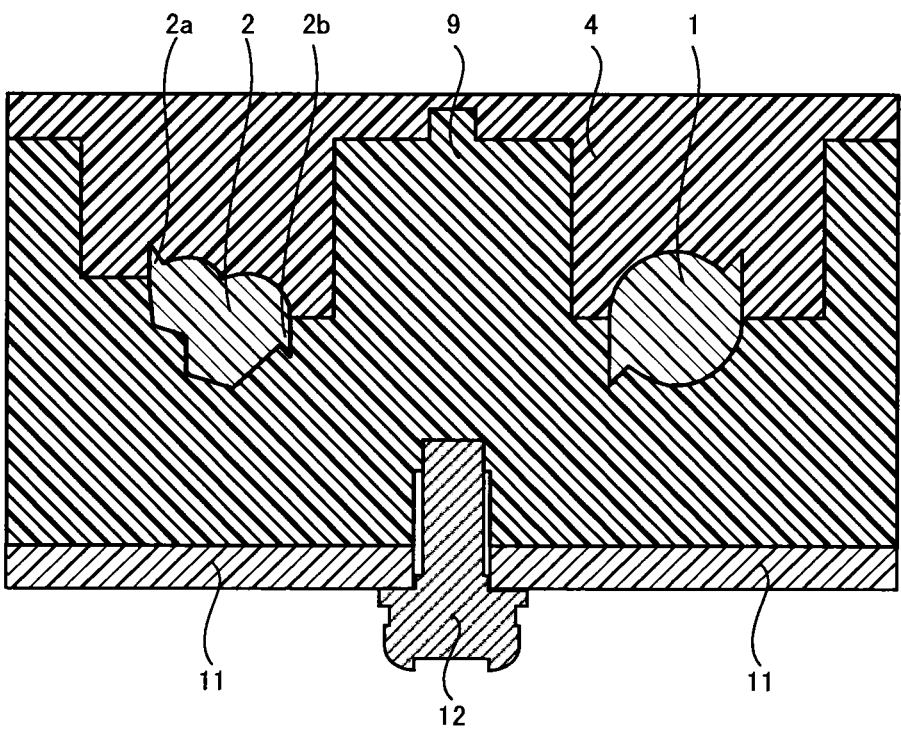
FIG. 12B is a cross-sectional view along line A-A cross section of the image sensor unit according to modification 2.
Figure 12C:
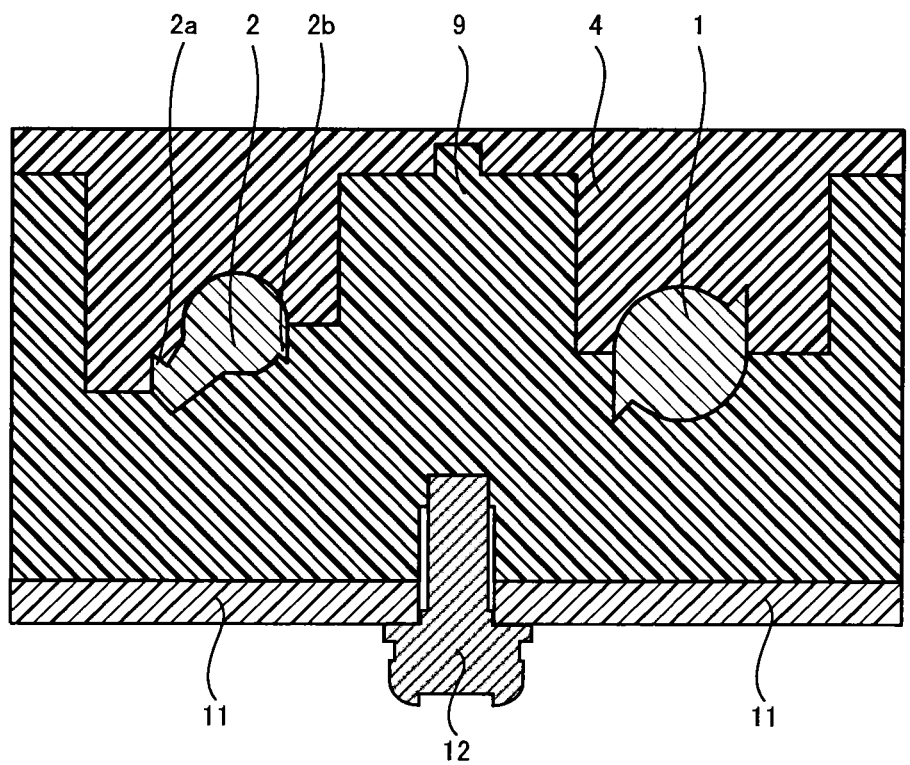
FIG. 12C is a cross-sectional view along line A-A cross section of the image sensor unit according to modification 3.
Figure 12D:
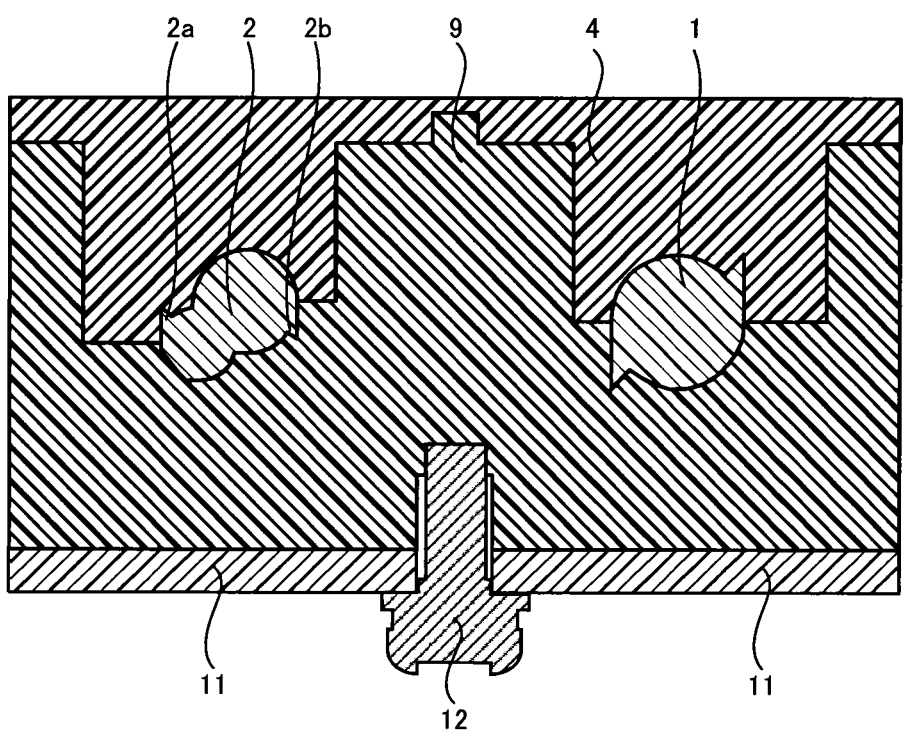
FIG. 12D is a cross-sectional view along line A-A cross section of the image sensor unit according to modification 4.
Figure 12E:
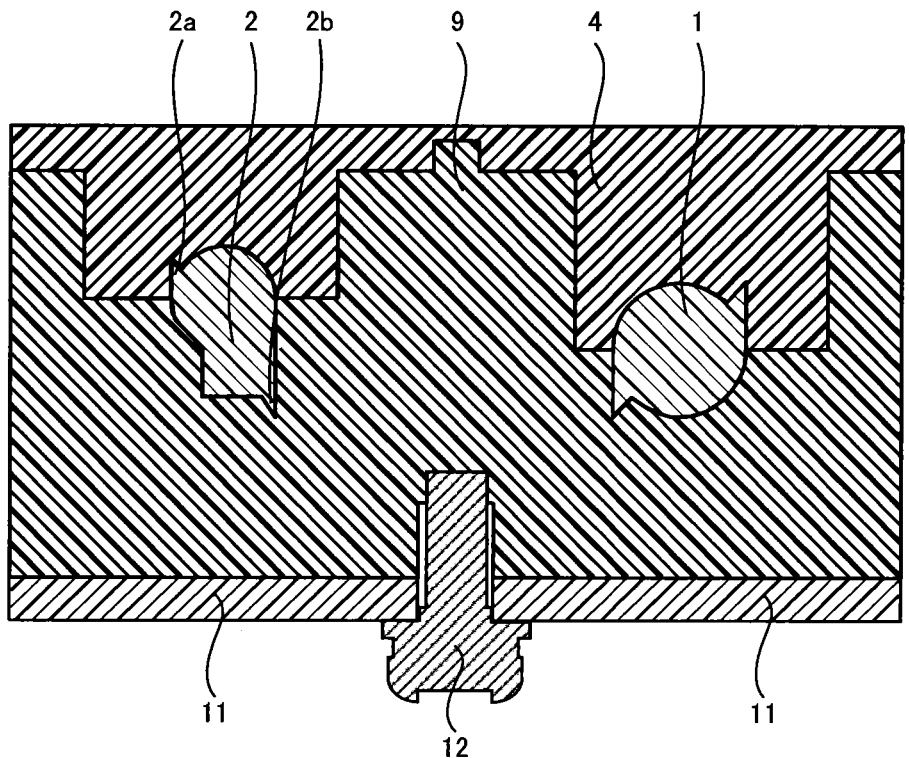
FIG. 12E is a cross-sectional view along line A-A cross section of the image sensor unit according to modification 5.
Figure 12F:
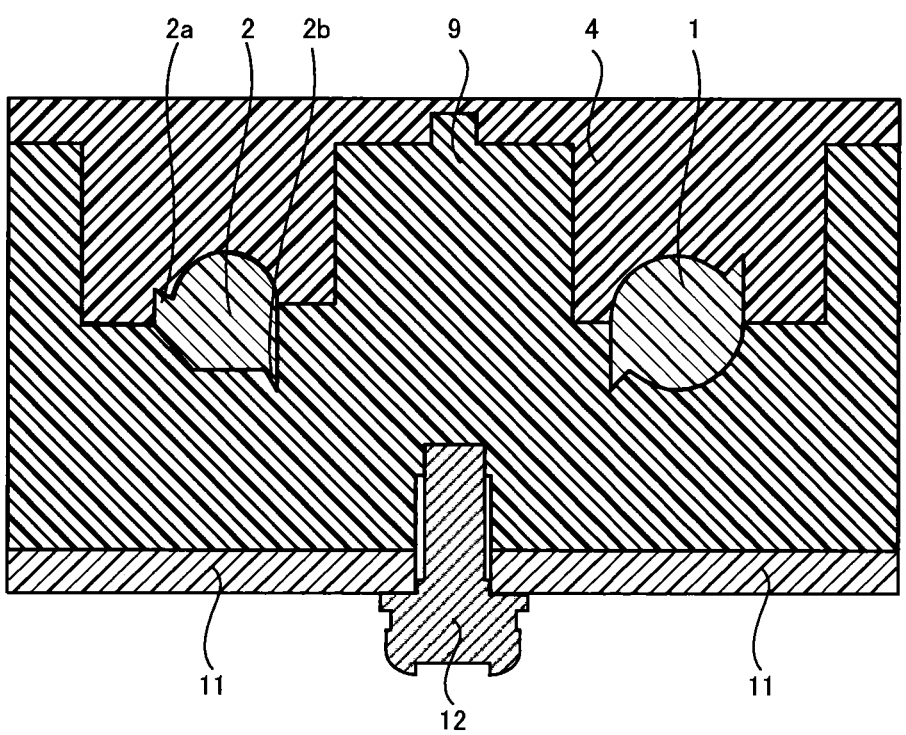
FIG. 12F is a cross-sectional view along line A-A cross section of the image sensor unit according to modification 6.

FIG. 12A is a cross-sectional view along line A-A cross section of the image sensor unit according to modified embodiment 1. FIG. 12B is a cross-sectional view along line A-A cross section of the image sensor unit according to modified embodiment 2. FIG. 12C is a cross-sectional view along line A-A cross section of the image sensor unit according to modified embodiment 3. FIG. 12D is a cross-sectional view along line A-A cross section of the image sensor unit according to modified embodiment 4. FIG. 12E is a cross-sectional view along line A-A cross section of the image sensor unit according to modified embodiment 5. FIG. 12F is a cross-sectional view along line A-A cross section of the image sensor unit according to modified embodiment 6.

The light guide having the function of emitting light in two or more directions is complicated in shape in comparison with the light guide having the function of emitting light in only one direction. However, even though the shape is complicated, the light guide 2 is held in a similar manner as the light guide 1 which is simple in shape. In other words, the position of the light guide 2 is fixed in the Y-direction and the Z-direction by being sandwiched between the light guide holder 4*c* and the light guide holder 9*h*. In this circumstance, the protrusion 2*a* formed on the light guide 2 is inserted into the notch 4*e* formed on the cover 4, and the protrusion 2*b* formed on the light guide 2 is inserted into the notch 9*j* formed on the frame 9. As a result, the light guide 2 is prevented from moving in the X-direction and the light guide 2 is prevented from rotating around the axis in the X-direction.

In the foregoing embodiment, it is described about the configuration that holds the light guides 1 and 2 such that movement in the X-direction is prevented completely. In the present disclosure, a configuration can be adopted so that the light guides 1 and 2 are held such that movement in the X-direction is not completely prevented. The image sensor unit according to modified embodiment 7 is described hereinafter with reference to FIGS. 13 and 14.

Figure 13:
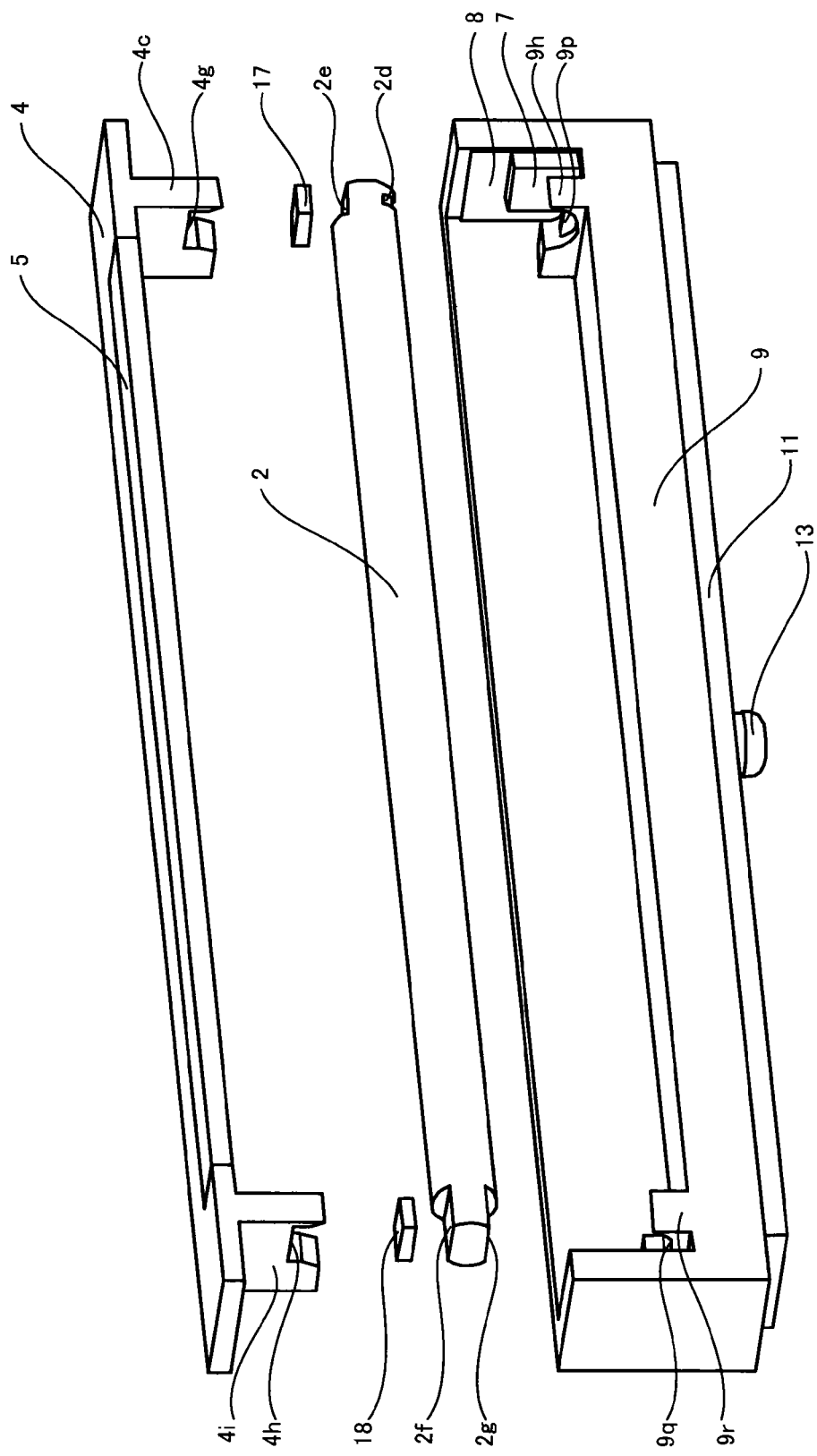
FIG. 13 is an exploded perspective view of the vicinity of the light guide of the image sensor unit according to modification 7.
Figure 14:
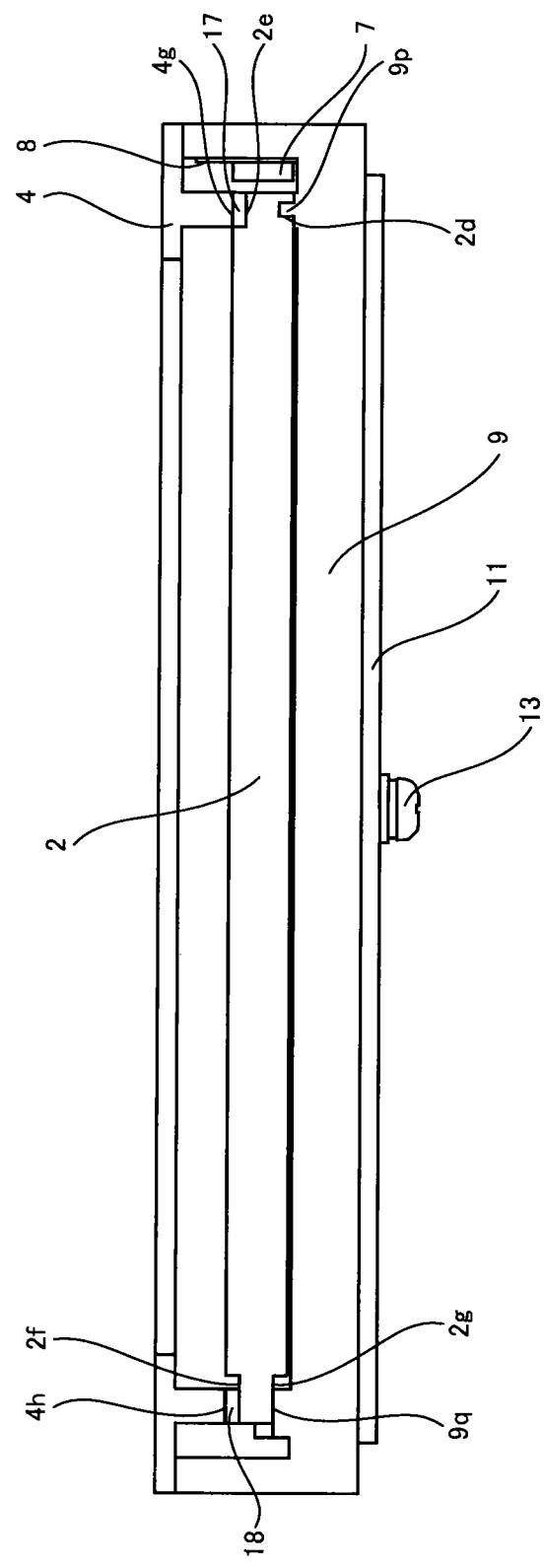
FIG. 14 is a diagram showing schematically the light guide held by the image sensor unit according to modification 7.

FIG. 13 is an exploded perspective view of the vicinity of the light guide 2 of the image sensor unit according to modified embodiment 7. FIG. 14 is a diagram schematically showing the light guide 2 fixed by the image sensor unit according to modified embodiment 7. Although the method of holding the light guide 2 is described, the method of holding the light guide 1 is similar to the method for the light guide 2.

The cover 4 includes the light guide holders 4*c* and 4*i* and also elastic body contact surfaces 4*g* and 4*h*. The frame 9 includes a light guide holder 9*h* and a positioning protrusion 9*p* which is provided on the light guide holder 9*h*. The light guide 2 is held by and sandwiched between the light guide holder 4*c* and the light guide holder 9*h*, and is held by and sandwiched between a light guide holder 4*i* and a light guide holder 9*r*. Thereby the position of the light guide 2 is fixed in the Y-direction and the Z-direction.

Here, an elastic body 17 is sandwiched and crushed between an elastic body contact surface 2*e* and an elastic body contact surface 4*g*. In this state, the repellent force causes a positioning groove 2*d* of the light guide 2 to be pushed in the Z-direction against the positioning protrusion 9p of the frame 9, thereby fixing the position thereof. Also, the fitting of the positioning protrusion 9p into the positioning groove 2d secures the position in the X-direction of the light guide 2.

Of the end portions in the X-direction of the light guide 2, the end portion that is not the end portion with the positioning groove 2d formed on it, has an elastic body contact surface 2f and a frame contact surface 2g. One surface of an elastic body 18 is in contact with the elastic body contact surface 4h of the cover 4 whereas the surface on the opposite side of the elastic body 18 is in contact with the elastic body contact surface 2f of the light guide 2. The light guide 2 is pushed against the light guide contact surface 9q of the frame 9 by force received from the elastic body 18. The frame contact surface 2g of the light guide 2 is in contact with the light guide contact surface 9q of the frame 9 but movement in the X-direction is not restricted.

Here, the thermal expansion coefficient is different for the light guide 2 and the frame 9, when there is a difference in the expansion amount in the X-direction (when the way of expansion in the X-direction differs between the light guide 2 and the frame 9) the positional relationship remains unchanged, because the positioning grove 2d and the positioning protrusion 9p is press-fitted together. Also, difference in the expansion amount is absorbed by the shifting of the areas of the frame contact surface 2g and the light guide contact surface 9q that bring into contact with each other.

As described previously, the end portion provided with the positioning grove 2d among the end portions in the X-direction of the light guide 2, has the unchanged positional relationship with the frame 9. Therefore, the positional relationship remains unchanged between the light emitting surface 7a of the light source 7 installed onto the frame 9 via the light source board 8, and the end surface on the end portion of the light guide 2 on which the positioning groove 2d is formed. Thus, the amount of light emitted from the light source 7 to the light guide 2 can be kept constant even when the frame 9 and the light guide 2 expand due to heat. Furthermore, the foregoing configuration can prevent the light guide 2 and the frame 9 from deforming even when the thermal expansion coefficient is different for the light guide 2 and the frame 9.

In the foregoing embodiment, the light guide 1 and the light guide 2 are described as being substantially circular columnar shaped. In the present disclosure, shapes of the light guide 1 and the light guide 2 are not limited to a substantially circular columnar shape. For example, the light guide 1 and the light guide 2 can be an elliptical columnar shape of which cross-section and end surfaces are ellipses, or can be a polygonal-shape of which cross-section and ends surfaces are polygons.

In the foregoing embodiment, the image reading device is described as having the transparent plate 5. In the present disclosure, the image reading device may not be provided with the transparent plate 5. For example, if the copier or multi-function printer mounted with an image reading device utilizes the transparent plate 5, the image sensor unit 100 may not be provided with the transparent plate 5.

In the foregoing embodiment, a method of installing an image reading device into a copier, a multi-function printer, and the like is omitted. Any method can be used to install an image reading device into a copier, a multi-function printer, and the like. For example, holes can be bored into both end portions in the X-direction (both end portions outside of the reading area in the read width direction) of the frame 9 for screws and bolts used for installing the image reading device into a copier, a multi-function printer, and the like.

Furthermore, in the foregoing embodiment, an example in which the lens 3 is a line sensor composed of a rod lens array is described. In the present disclosure, the lens 3 is not limited to this example. For example, the lens 3 can be a line sensor composed of a macro lens array. Alternatively, the lens 3 can be composed of a lens or mirror composing a reductive optical system image sensor.

In the foregoing embodiment, the example in which the cover 4 and the frame 9 are fixed together by fitting the positioning protrusion 9e into the positioning hole 4a and the sensor board 11 and the frame 9 are fixed together by fastening members such as screws is described. In the present disclosure, the method of fixing the cover 4 and the frame 9 together and the method of fixing the sensor board 11 and the frame 9 together are not limited to these examples. For example, pins, rivets, or attachments can be used as the fastening members instead of screws.

Also, the cover 4 and the frame 9 can be fixed together by fastening members, and the sensor board 11 and the frame 9 can be fixed together via press-fitting. For example, when the sensor board 11 and the frame 9 are fixed together by press-fitting, the protrusion formed on the sensor board 11 can be press-fitted into the hole formed on the frame 9, or the protrusion formed on the frame 9 can be press-fitted into the hole formed on the sensor board 11. Alternatively, a step can be formed on the inside of the trim of the frame 9, and the sensor board 11 can be fitted therein.

In the foregoing embodiment, an example is given in which there is space between one end surface of the light guide 1 and the light source 6. In the present disclosure, various types of configurations can be adopted in which the light emitted from the light source 6 propagates to one end surface of the light guide 1. For example, a part or all of the space between one end surface of the light guide 1 and the light source 6 can be filled with a transparent substance (solid, liquid, or gaseous). Alternatively, one end surface of the light guide 1 and the light emitting surface 6a of the light source 6 can be in close contact with each other. Likewise, when the light emitted from the light source 7 is configured to propagate to one end surface of the light guide 2, any configuration between one end surface of the light guide 2 and the light source 7 is acceptable.

In the foregoing embodiment, an example is given in which the light source 6 is positioned on one end surface of the light guide 1. In the present disclosure, the light source 6 can be positioned on both end surfaces of the light guide 1. Likewise, the light source 7 can be positioned on both ends surfaces of the light guide 2.

The present disclosure can be embodied in various ways and can undergo various modifications without departing from the broad spirit and scope of the disclosure. Moreover, the embodiment described above is for explaining the present disclosure, and does not limit the scope of the present disclosure. In other words, the scope of the present disclosure is as set forth in the Claims and not the embodiment. Various changes and modifications that are within the scope disclosed in the claims or that are within a scope that is equivalent to the claims of the disclosure are also included within the scope of the present disclosure.

This application claims the benefit of priority based on Japanese Patent Application No. 2013-033287, filed on Feb. 22, 2013 and Japanese Patent Application No. 2013-037849, filed on Feb. 27, 2013, the entire disclosures of which are incorporated herein by reference including the specification, the claims, and the drawings.

INDUSTRIAL APPLICABILITY

The present disclosure can be applied to contact-type image sensor units.

REFERENCE SIGNS LIST 1, 2 Light guide
1a, 1b, 2a, 2b Protrusion
1c, 2c Scattering zone
2d Positioning groove
2e, 2f Elastic body contact surface
2g Frame contact surface
3 Lens
4 Cover
4a Positioning hole
4b, 4c, 4i Light guide holder
4d, 4e Notch
4f Transparent plate holder
4g, 4h Elastic body contact surface
5 Transparent plate
6, 7 Light source
6a, 7a Light emitting surface
8 Light source board
8a Inserting section
8b Bottom surface
9 Frame
9a, 9b, 9c Insertion hole
9d Insertion through-hole
9e Positioning protrusion
9f Groove
9g, 9h, 9r Light guide holder
9i, 9j Notch
9k Lens holder
9m Light source board bottom contact surface
9n Light source board contact surface
9p Positioning protrusion
9q Light guide contact surface
10 Line sensor
11 Sensor board
11a, 11b, 11c Insertion through-hole
12, 13, 14 Fastening member
15 Connector
16 Subject to be read
17, 18 Elastic body
100 Image sensor unit

The invention claimed is:

1. An image sensor unit, comprising:
a columnar light guide configured to emit a light, emitted to an end surface of the light guide, from a side surface thereof toward a subject to be read;
a light source positioned facing the end surface of the light guide, and configured to emit light toward the end surface of the light guide;
a lens configured to converge the light emitted from the side surface of the light guide and reflected by the subject to be read in a width direction of the light guide;
a frame having frame-shape and configured to house the light guide and the lens, the frame including a first support configured to support a first to-be-supported section on the side surface of the light guide, wherein the first to-be-supported section is provided on both end portions in the lengthwise direction of the light guide;
a cover configured to cover at least a part of one opening of the frame and not to restrict light from passing through from the light guide to the subject to be read, the cover including a second support configured to support a second to-be-supported section on the side surface of the light guide, wherein the second to-be-supported section is opposite to the first to-be-supported section and is provided on both end portions in the lengthwise direction of the light guide;
a line sensor configured to receive the light converged in a width direction of the light guide by the lens; and
a sensor board onto which the line sensor is mounted along a lengthwise direction of the light guide, configured to cover the other opening of the frame,
wherein the light guide is fixed inside the frame by a flange portion composed of the first support of the frame and the second support of the cover.

2. The image sensor unit according to claim 1, wherein
the light source is housed inside the frame, and
the flange portion is configured to block a path from which the light emitted from the light source leaks from the one opening of the frame to the outside of the image sensor unit not passing through the light guide.

3. The image sensor unit according to claim 1, wherein
the light guide is circular columnar shaped and includes a first protrusion provided on the first to-be-supported section,
the frame includes a first hole provided in the first support, and
the light guide is prevented from rotating by fitting the first protrusion into the first hole.

4. The image sensor unit according to claim 1, wherein
the light guide is circular columnar shaped and includes a second protrusion provided on the second to-be-supported section,
the cover includes a second hole provided in the second support, and
the light guide is prevented from rotating by fitting the second protrusion into the second hole.

5. The image sensor unit according to claim 1, wherein the sensor board is fixed to the frame on an extension line of a line onto which the line sensor is mounted.

6. The image sensor unit according to claim 5, wherein
the sensor board includes through-holes on the extension line of the line onto which the line sensor is mounted,
the frame includes holes in portions corresponding to the through-holes formed on the sensor board, and
further comprising fastening members that fasten the sensor board with the frame by passing through the through-holes provided in the sensor board and by fitting in the holes provided in the frame.

7. The image sensor unit according to claim 6, further comprising:
a light source board on which the light source is mounted, the light source board including a flexible portion; and
a connector positioned on the opposite surface of the sensor board, the connector configured to couple the light source board with an external device,
wherein the frame includes a through-hole, and
the flexible portion of the light source board passes through the through-hole provided in the frame, extends over the fastening members and couples with the connector.

8. The image sensor unit according to claim 5, wherein
the frame includes protrusions at portions intersecting a plane passing on a line, onto which the line sensor is mounted, the plane being orthogonal to the sensor board,
the cover includes holes at portions corresponding to the protrusions provided in the frame, and the frame and the cover are fixed by fitting the protrusions provided in the frame into the holes provided in the cover.

9. An image sensor unit manufacturing method, the unit including:
- a light guide that is column shaped and configured to emit a light from a side surface thereof toward a subject to be read, the light emitted to an end surface of the light guide;
- a light source positioned facing the end surface of the light guide, and configured to emit light toward the end surface of the light guide;
- a lens configured to cause the light reflected by the subject to be read to converge in a width direction of the light guide, the light emitted from the side surface of the light guide;
- a frame that is frame shaped and configured to house the light guide and the lens;
- a cover configured to cover at least a part of one opening of the frame and not to restrict light from passing through between the light guide and the subject to be read;
- a line sensor configured to receive light converged in a width direction of the light guide by the lens; and
- a sensor board onto which the line sensor is mounted along a lengthwise direction of the light guide, configured to cover the other opening of the frame, the method comprising:
- forming a first support that supports a first to-be-supported section on the side surface of the light guide, wherein the first to-be-supported section is provided on both end portions in the lengthwise direction of the light guide,
- forming a second support that supports a second to-be-supported section on the side surface of the light guide, wherein the second to-be-supported section is opposite to the first to-be-supported section and is provided on both end portions in the lengthwise direction of the light guide, and
- providing a flange portion composed of the first support provided on the frame and the second support provided on the cover between which the light guide is sandwiched, and fixing the light guide inside the frame.

10. The image sensor unit manufacturing method according to claim 9, further comprising:
- covering the other opening of the frame with the sensor board by fixing the sensor board to the frame on an extension line of a line onto which the line sensor is mounted.

* * * * *